US011894008B2

(12) United States Patent
Takahashi

(10) Patent No.: US 11,894,008 B2
(45) Date of Patent: Feb. 6, 2024

(54) SIGNAL PROCESSING APPARATUS, TRAINING APPARATUS, AND METHOD

(71) Applicant: SONY CORPORATION, Tokyo (JP)

(72) Inventor: Naoya Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 274 days.

(21) Appl. No.: 16/769,122

(22) PCT Filed: Nov. 28, 2018

(86) PCT No.: PCT/JP2018/043694
§ 371 (c)(1),
(2) Date: Jun. 2, 2020

(87) PCT Pub. No.: WO2019/116889
PCT Pub. Date: Jun. 20, 2019

(65) Prior Publication Data
US 2021/0225383 A1 Jul. 22, 2021

(30) Foreign Application Priority Data
Dec. 12, 2017 (JP) ................................ 2017-237401

(51) Int. Cl.
*G10L 21/00* (2013.01)
*G10L 25/00* (2013.01)
(Continued)

(52) U.S. Cl.
CPC .......... *G10L 21/007* (2013.01); *G10L 21/013* (2013.01); *G10L 21/028* (2013.01)

(58) Field of Classification Search
CPC ..... G10L 21/00; G10L 21/16; G10L 21/0272; G10L 21/028; G10L 21/0308;
(Continued)

(56) References Cited

U.S. PATENT DOCUMENTS 9,640,197 B1 * 5/2017 Fukuda ................. G10L 21/028
10,839,822 B2 * 11/2020 Chen .................. G10L 21/0216
(Continued)

FOREIGN PATENT DOCUMENTS

CN 101578659 A 11/2009
CN 102750952 A 10/2012
(Continued)

OTHER PUBLICATIONS

Xie, et al., "A KI Divergence And Dnn-Based Approach To Voice Conversion Without Parallel Training Sentences", INTERSPEECH 2016, Copyright © 2016 ISCA, Sep. 8-12, 2016, pp. 287-291.
(Continued)

*Primary Examiner* — Michael Ortiz-Sanchez
(74) *Attorney, Agent, or Firm* — CHIP LAW GROUP

(57) ABSTRACT

Provided is a signal processing apparatus that includes a voice quality conversion unit that converts acoustic data of any sound of an input sound source to acoustic data of voice quality of a target sound source different from the input sound source on the basis of a voice quality converter parameter obtained by training using acoustic data for each of one or more sound sources as training data, the acoustic data being different from parallel data or clean data.

15 Claims, 8 Drawing Sheets

(51) Int. Cl.

| | |
|---|---|
| ***G10L 21/007*** | (2013.01) |
| ***G10L 21/028*** | (2013.01) |
| ***G10L 21/013*** | (2013.01) |

(58) Field of Classification Search

CPC ......... G10L 21/02; G10L 13/00; G10L 13/02; G10L 17/04; G10L 17/06; G10L 17/18; G10L 17/20; G10L 17/00; G10L 25/03; G10L 25/27; G10L 25/45; G10L 25/75; G10L 25/48; G10L 25/90; G10L 21/007; G10L 21/003; G10L 21/013; G10L 2021/0135; G10L 25/51; G10L 25/60; G10K 15/02

See application file for complete search history.

(56) References Cited

U.S. PATENT DOCUMENTS

| | | | | |
|---|---|---|---|---|
| 2007/0168189 | A1* | 7/2007 | Tamura | G10L 13/033 704/235 |
| 2009/0094027 | A1* | 4/2009 | Nurminen | G10L 13/033 704/235 |
| 2010/0082340 | A1 | 4/2010 | Nakadai et al. | |
| 2015/0356980 | A1* | 12/2015 | Sako | G10L 21/0208 704/226 |
| 2016/0071520 | A1* | 3/2016 | Hayakawa | G10L 17/04 704/247 |
| 2017/0110125 | A1* | 4/2017 | Xu | G10L 15/22 |
| 2019/0051314 | A1* | 2/2019 | Nakashika | G10L 21/007 |
| 2020/0286499 | A1* | 9/2020 | Duong | G10L 21/003 |

FOREIGN PATENT DOCUMENTS

| | | | |
|---|---|---|---|
| CN | 103280224 | A | 9/2013 |
| CN | 104123932 | A | 10/2014 |
| CN | 106504741 | A | 3/2017 |
| CN | 106971741 | A | 7/2017 |
| EP | 2947658 | A1 | 11/2015 |
| JP | 2010-049249 | A | 3/2010 |
| JP | 2011-059146 | A | 3/2011 |
| JP | 2012-215606 | A | 11/2012 |
| WO | 2008/142836 | A1 | 11/2008 |
| WO | 2014/112206 | A1 | 7/2014 |
| WO | WO-2017146073 | A1 | 8/2017 |

OTHER PUBLICATIONS

Xie, et al., "A KI Divergence And Dnn-Based Approach To Voice Conversion Without Parallel Training Sentences", INTERSPEECH 2016, ISCA, Sep. 8-12, 2016, pp. 287-291.

International Search Report and Written Opinion of PCT Application No. PCT/JP2018/043694, dated Feb. 5, 2019, 12 pages of ISRWO.

Feng-Long, et al., "A KL Divergence and DNN-based Approach to Voice Conversion without Parallel Training Sentences", INTERSPEECH 2016, Sep. 8-12, 2016, 5 pages.

* cited by examiner

SIGNAL PROCESSING APPARATUS, TRAINING APPARATUS, AND METHOD

CROSS REFERENCE TO RELATED APPLICATIONS

This application is a U.S. National Phase of International Patent Application No. PCT/JP2018/043694 filed on Nov. 28, 2018, which claims priority benefit of Japanese Patent Application No. JP 2017-237401 filed in the Japan Patent Office on Dec. 12, 2017. Each of the above-referenced applications is hereby incorporated herein by reference in its entirety.

TECHNICAL FIELD

The present technology relates to a signal processing apparatus and method, a training apparatus and method, and a program, and more particularly to a signal processing apparatus and method, a training apparatus and method, and a program that can more easily perform voice quality conversion.

BACKGROUND ART

In recent years, there has been an increasing need for voice quality conversion technology that converts the voice quality of one speaker into the voice quality of another speaker.

For example, in a voice agent widely used in smartphones, network speakers, intelligent headphones, and the like, a response or reading aloud is performed with a voice quality predetermined by voice synthesis. On the other hand, there is a demand that a message be read aloud with the voice quality of a family or a friend in order to add the personality of the message or a demand that a response be made with the voice of a favorite voice actor, actor, singer, or the like.

Furthermore, in the field of music, there are vocaloid-based songs and expression methods in which an effector that greatly changes the voice quality of the original singer is applied to the singing voice, but intuitive editing methods such as "approaching the voice quality of singer A" have not yet been put in practice. Moreover, there is also a demand that a song be made into an instrumental tune including only instrumental sounds to enjoy it as background music.

Therefore, there has been proposed a technique for converting the voice quality of input voice.

For example, as such a technique, there has been proposed a voice quality conversion apparatus that can convert input acoustic data into acoustic data of a target speaker by providing only acoustic data of a vowel pronunciation of a target speaker as training data (see, for example, Patent Document 1).

Furthermore, for example, there has been proposed a voice quality conversion method that does not require input of vowel section information indicating a vowel section by estimating a vowel section by voice recognition (see, for example, Non-Patent Document 1).

CITATION LIST

Patent Document

Patent Document 1: WO 2008/142836 A1

Non-Patent Document

Non-Patent Document 1: A KL Divergence and DNN-based Approach to voice quality conversion without Parallel Training Sentences, Interspeech2016

SUMMARY OF THE INVENTION

Problems to be Solved by the Invention

However, the above-described techniques have not been able to easily perform voice quality conversion.

For example, in order to design an existing voice quality converter, parallel data in which an input speaker as a voice conversion source and a target speaker as a conversion destination uttered the same content is required. This is because the correspondence between the input speaker and the target speaker is obtained for each phoneme, and the difference in voice quality is modeled instead of the difference in phoneme.

Therefore, in order to obtain a voice quality converter, acoustic data of a voice uttered by a target speaker with a predetermined content is necessary. In many situations, it is difficult to obtain such acoustic data for an arbitrary speaker.

According to the technique described in Patent Document 1 described above, even if there is no parallel data, voice quality conversion can be performed if acoustic data of the vowel pronunciation of the target speaker is present as training data. However, the technique described in Patent Document 1 requires clean data that does not include noise or sounds other than the target speaker and vowel section information indicating a vowel section, and it is still difficult to obtain data.

Furthermore, in the technique described in Non-Patent Document 1, voice quality conversion can be performed without vowel section information by using voice recognition, but since this technique also requires clean data, data acquisition is still difficult. Furthermore, according to the technique described in Non-Patent Document 1, it cannot be said that the performance of voice quality conversion is sufficient.

The present technology has been made in view of such circumstances and enables easier voice quality conversion.

Solutions to Problems

A signal processing apparatus of a first aspect of the present technology includes: a voice quality conversion unit configured to convert acoustic data of any sound of an input sound source to acoustic data of voice quality of a target sound source different from the input sound source on the basis of a voice quality converter parameter obtained by training using acoustic data for each of one or more sound sources as training data, the acoustic data being different from parallel data or clean data.

A signal processing method or program of a first aspect of the present technology includes: a step of converting acoustic data of any sound of an input sound source to acoustic data of voice quality of a target sound source different from the input sound source on the basis of a voice quality converter parameter obtained by training using acoustic data for each of one or more sound sources as training data, the acoustic data being different from parallel data or clean data.

According to a first aspect of the present technology, acoustic data of any sound of an input sound source is converted to acoustic data of voice quality of a target sound source different from the input sound source on the basis of a voice quality converter parameter obtained by training using acoustic data for each of one or more sound sources as training data, the acoustic data being different from parallel data or clean data.

A signal processing apparatus according to a second aspect of the present technology includes: a sound source separation unit configured to separate predetermined acoustic data into acoustic data of a target sound and acoustic data of a non-target sound by sound source separation; a voice quality conversion unit configured to perform voice quality conversion on the acoustic data of the target sound; and a synthesizing unit configured to synthesize acoustic data obtained by the voice quality conversion and acoustic data of the non-target sound.

A signal processing method or program according to a second aspect of the present technology includes the steps of: separating predetermined acoustic data into acoustic data of a target sound and acoustic data of a non-target sound by sound source separation; performing voice quality conversion on the acoustic data of the target sound; and synthesizing acoustic data obtained by the voice quality conversion and acoustic data of the non-target sound.

According to a second aspect of the present technology, predetermined acoustic data is separated into acoustic data of a target sound and acoustic data of a non-target sound by sound source separation; voice quality conversion is performed on the acoustic data of the target sound; and acoustic data obtained by the voice quality conversion and acoustic data of the non-target sound are synthesized.

A training apparatus according to a third aspect of the present technology includes: a training unit configured to train a discriminator parameter for discriminating a sound source of input acoustic data using each acoustic data for each of a plurality of sound sources as training data, the acoustic data being different from parallel data or clean data.

A training method or program according to a third aspect of the present technology includes: a step of training a discriminator parameter for discriminating a sound source of input acoustic data using each acoustic data for each of a plurality of sound sources as training data, the acoustic data being different from parallel data or clean data.

According to a third aspect of the present technology, a discriminator parameter for discriminating a sound source of input acoustic data is trained using each acoustic data for each of a plurality of sound sources as training data, the acoustic data being different from parallel data or clean data.

A training apparatus according to a fourth aspect of the present technology includes: a training unit configured to train a voice quality converter parameter for converting acoustic data of any sound of an input sound source to acoustic data of voice quality of a target sound source different from the input sound source using acoustic data for each of one or more sound sources as training data, the acoustic data being different from parallel data or clean data.

A training method or program according to a fourth aspect of the present technology includes: a step of training a voice quality converter parameter for converting acoustic data of any sound of an input sound source to acoustic data of voice quality of a target sound source different from the input sound source using acoustic data for each of one or more sound sources as training data, the acoustic data being different from parallel data or clean data.

According to a fourth aspect of the present technology, a voice quality converter parameter for converting acoustic data of any sound of an input sound source to acoustic data of voice quality of a target sound source different from the input sound source is trained using acoustic data for each of one or more sound sources as training data, the acoustic data being different from parallel data or clean data.

Effects of the Invention

According to the first to fourth aspects of the present technology, voice quality conversion can be performed more easily.

Note that effects described herein are not necessarily limited, but may also be any of those described in the present disclosure.

MODE FOR CARRYING OUT THE INVENTION

An embodiment to which the present technology has been applied is described below with reference to the drawings.

First Embodiment

Regarding the Present Technology

The present technology makes it possible to perform voice quality conversion on voices and the like of arbitrary utterance content that is not predetermined even in a situation where it is difficult to obtain not only parallel data but also clean data. That is, the present technology enables voice quality conversion to be easily performed without requiring parallel data or clean data.

Note that the parallel data is acoustic data of a plurality of speakers having the same utterance content, and the clean data is acoustic data of only the sound of a target sound source without noise or other unintended sounds, i.e., the acoustic data of the clean speech of the target sound source.

In general, obtaining acoustic data not only of the sound of the target sound source (speaker) but also of a mixed sound that contains noise or other unintended sounds is much easier than obtaining parallel data or clean data.

A large number of acoustic data of a mixed sound including a target speaker's voice can be obtained relatively easily, for example, by obtaining acoustic data of a mixed sound from a movie or drama for the voice of an actor, or obtaining acoustic data of a mixed sound from a compact disc (CD) for the voice of a singer. Therefore, in the present technology, voice quality conversion can be performed by a statistical method using such acoustic data of a mixed sound.

Figure 1:
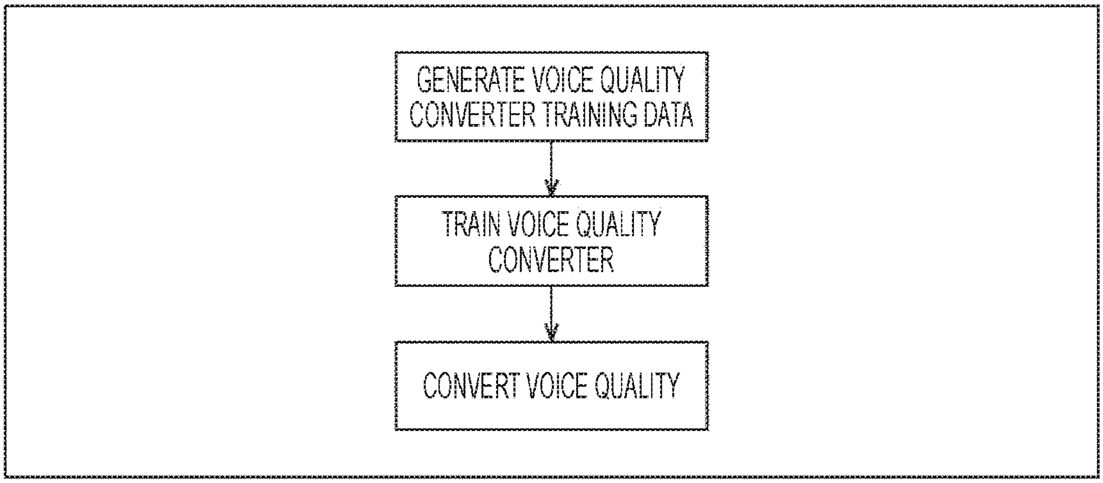
FIG. 1 is a diagram explaining a flow of a voice quality conversion processing.

Here, FIG. 1 illustrates a flow of processing in a case where the present technology has been applied.

As illustrated in FIG. 1, first, training data for training a voice quality converter used for voice quality conversion is generated.

The training data is generated on the basis of, for example, acoustic data of a mixed sound, and the acoustic data of the mixed sound is acoustic data of a mixed sound including at least a sound (acoustic sound) emitted from a predetermined sound source.

Here, the sound source of the sound included in the mixed sound is, for example, the sound source of a sound to be converted subjected to voice quality conversion, that is, the sound source of a sound before voice quality conversion, the sound source of a sound after voice quality conversion, that is, the sound source of a sound obtained by voice quality conversion, an arbitrary sound source different from the sound source of the sound before the voice quality conversion and the sound source of the sound after the voice quality conversion, or the like.

In particular, for example, the sound source of the sound to be converted subjected to voice quality conversion and the sound source of the sound after voice quality conversion are predetermined speakers (humans), musical instruments, virtual sound sources that output an artificially generated sound (virtual sound source), or the like. Furthermore, the arbitrary sound source different from the sound source of the sound before voice quality conversion and the sound source of the sound after voice quality conversion can also be an arbitrary speaker, an arbitrary musical instrument, an arbitrary virtual sound source, or the like.

Hereinafter, for the sake of simplicity for description, the description will be continued assuming that the sound source of the sound included in the mixed sound is a human (speaker). Furthermore, hereinafter, a speaker subjected to conversion by voice quality conversion is also referred to as an input speaker, and a speaker of the sound after voice quality conversion is also referred to as a target speaker. That is, in the voice quality conversion, the voice of the input speaker is converted into the voice of the voice quality of the target speaker.

Moreover, in the following, the acoustic data to be subjected to voice quality conversion, that is, the acoustic data of the voice of the input speaker is also referred to as input acoustic data in particular, and the acoustic data of the voice having the voice quality of the target speaker obtained by voice quality conversion on the input acoustic data is also referred to as output acoustic data in particular.

When generating the training data, training data is generated from the acoustic data of the mixed sound including the voice of the speaker, for example, for each of two or more speakers including the input speaker and the target speaker.

Here, the acoustic data of the mixed sound used for generating the training data is acoustic data that is neither parallel data nor clean data. Note that clean data or parallel data may be used as acoustic data used for generating training data, but the acoustic data used for generating training data does not need to be clean data or parallel data.

When the training data is obtained, subsequently, as illustrated in the center of FIG. 1, a voice quality converter is obtained by training on the basis of the obtained training data. More specifically, in the training of the voice quality converter, parameters used for voice quality conversion (hereinafter also referred to as voice quality converter parameters) are obtained. As an example, for example, when the voice quality converter is configured by a predetermined function, the coefficient of the function is a voice quality converter parameter.

When a voice quality converter is obtained by training, finally, voice quality conversion is performed using the obtained voice quality converter. That is, voice quality conversion by the voice quality converter is performed on arbitrary input acoustic data of the input speaker, and output acoustic data of the voice quality of the target speaker is generated. Therefore, the voice of the input speaker is converted into the voice of the target speaker.

Note that in a case where the input acoustic data is data of a sound other than a human voice, such as a sound of a musical instrument or an artificial sound of a virtual sound source, the sound source of the sound after voice quality conversion must be other than a human (speaker) such as a musical instrument or a virtual sound source. On the other hand, in a case where the input acoustic data is human voice data, the sound source of the sound after voice quality conversion is not limited to a human, but may be a musical instrument or a virtual sound source.

That is, a human voice can be converted into a sound of the voice quality of an arbitrary sound source, such as the voice of another human, the sound of a musical instrument, or an artificial sound, by the voice quality converter, but sounds other than a human voice, e.g., a sound of a musical instrument or an artificial sound, cannot be converted to the voice of the voice quality of a human.

<Example of Configuration of Training Data Generation Apparatus>

Now, the generation of the training data, the training of the voice quality converter, and the voice quality conversion using the voice quality converter described above will be described in more detail below.

First, the generation of training data is generated.

Figure 2:
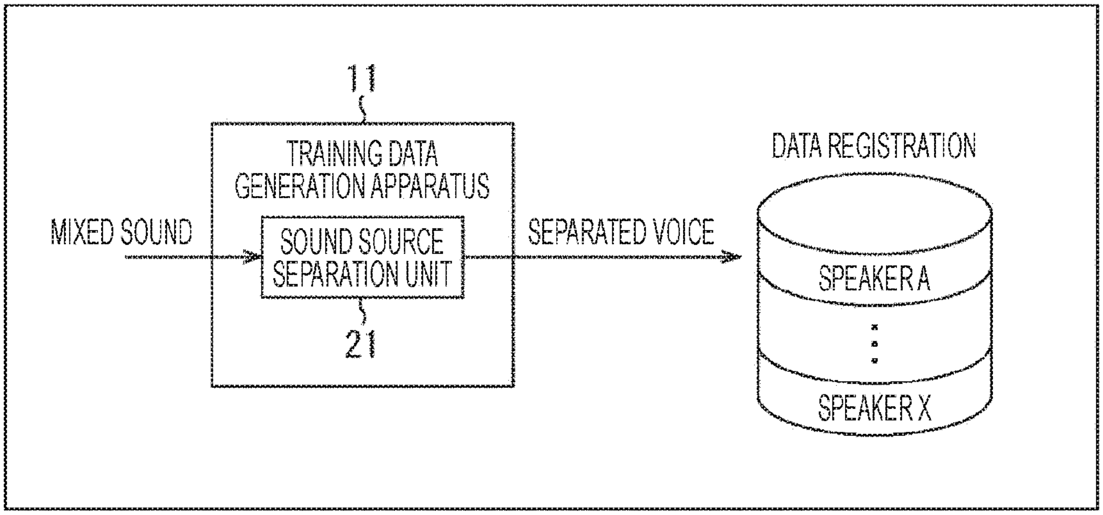
FIG. 2 is a diagram illustrating a configuration example of a training data generation apparatus.

The generation of the training data is performed by, for example, a training data generation apparatus 11 illustrated in FIG. 2.

The training data generation apparatus 11 illustrated in FIG. 2 includes a sound source separation unit 21 that generates training data by performing sound source separation.

In this example, the acoustic data (voice data) of the mixed sound is supplied to the sound source separation unit 21. The mixed sound of the acoustic data includes, for example, the voice of a predetermined speaker such as an input speaker or a target speaker (hereinafter, also referred to as a target voice) and sounds other than the target voice, such as music, environmental sound, and noise sound (hereinafter, also referred to as a non-target voice). The target voice here is a voice extracted by sound source separation, that is, a voice to be extracted.

Note that a plurality of acoustic data used for generating the training data may include not only the acoustic data of the mixed sound but also clean data and parallel data, and only the clean data and the parallel data may be used to generate the training data.

The sound source separation unit 21 includes, for example, a pre-designed sound source separator, and performs sound source separation on the supplied acoustic data of the mixed sound to extract the acoustic data of the target voice as the separated voice from the acoustic data of the mixed sound, and outputs the extracted acoustic data of the target voice as training data. That is, the sound source separation unit 21 separates the target voice from the mixed sound to generate training data.

For example, the sound source separator constituting the sound source separation unit 21 is a sound source separator obtained by synthesizing a plurality of sound source separation systems having outputs with different temporal properties and having the same separation performance, and a sound source separator designed in advance as the sound source separation unit 21 is used.

Note that such a sound source separator is described in detail, for example, in "S. Uhlich, M. Porcu, F. Giron, M. Enenkl, T. Kemp, N. Takahashi, and Y. Mitsufuji, "Improving Music Source Separation Based On Deep Networks Through Data Augmentation And Augmentation And Network Blending," in Proc. ICASSP, 2017, pp. 261265." and the like.

In the sound source separation unit 21, for each of a plurality of speakers, such as an input speaker and a target speaker, training data is generated from acoustic data of a mixed sound in which a speaker's voice is included as a target voice, and is output to and registered in a database or the like. In this example, training data obtained for a plurality of speakers, from training data obtained for speaker A to training data obtained for speaker X, is registered in the database.

The training data obtained in this manner can be used offline, for example, as in a first voice quality converter training method described later, or can be used online as in a second voice quality converter training method described later. Furthermore, the training data can be used both offline and online, for example, as in a third voice quality converter training method described later.

Note that in training to obtain a voice quality converter, it is only necessary to have training data of at least two speakers, the target speaker and the input speaker. However, in a case where the training data is used offline as in the first voice quality converter training method or the third voice quality converter training method described later, when the training data of a large number of speakers in addition to the input speaker and the target speaker is prepared in advance, a higher quality voice quality conversion can be achieved.

<Description of Training Data Generation Processing>

Figure 3:
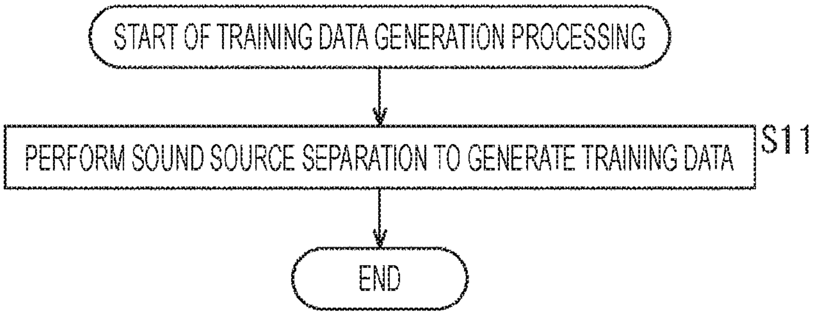
FIG. 3 is a flowchart explaining training data generation processing.

Here, the training data generation processing by the training data generation apparatus 11 will be described with reference to the flowchart in FIG. 3. For example, the training data generation processing is performed on acoustic data of mixed sounds of a plurality of speakers including at least a target speaker and an input speaker.

In step S11, the sound source separation unit 21 generates training data by performing sound source separation on the supplied acoustic data of the mixed sound to separate the acoustic data of the target voice. In sound source separation, only the target voice such as a speaker's singing voice and utterance are separated (extracted) from the mixed sound, and acoustic data of the target voice, which is a separated voice, is used as training data.

The sound source separation unit 21 outputs the training data obtained by the sound source separation to a subsequent stage, and the training data generation processing ends.

The training data output from the sound source separation unit 21 is held, for example, in association with a speaker ID indicating a speaker of a target voice of the original acoustic data used for generating the training data. Therefore, by referring to the speaker IDs associated with the respective training data, it is possible to specify from which acoustic data of the speaker the training data has been generated, that is, which voice data of which speaker the training data is.

As described above, the training data generation apparatus 11 performs sound source separation on the acoustic data of the mixed sound, and sets the acoustic data of the target voice extracted from the mixed sound as the training data.

By extracting the acoustic data of the target voice from the mixed sound by sound source separation, the acoustic data equivalent to the clean data, that is, the acoustic data of only the target voice without any non-target voice can be easily obtained as training data.

<Example of Configuration of Discriminator Training Apparatus and Voice Quality Converter Training Apparatus>

Subsequently, training of the voice quality converter using the training data obtained by the above processing will be described. In particular, here, a speaker discriminator-based method will be described as one of the training methods of the voice quality converter.

Hereinafter, this speaker discriminator-based method is referred to as a first voice quality converter training method. In the first voice quality converter training method, there is no need to hold training data of speakers other than the input speaker at the time of training the voice quality converter. Therefore, a large-capacity storage for holding training data is not needed, which is effective for achievement with an embedded device. That is, offline training of the voice quality converter is possible.

Figure 4:
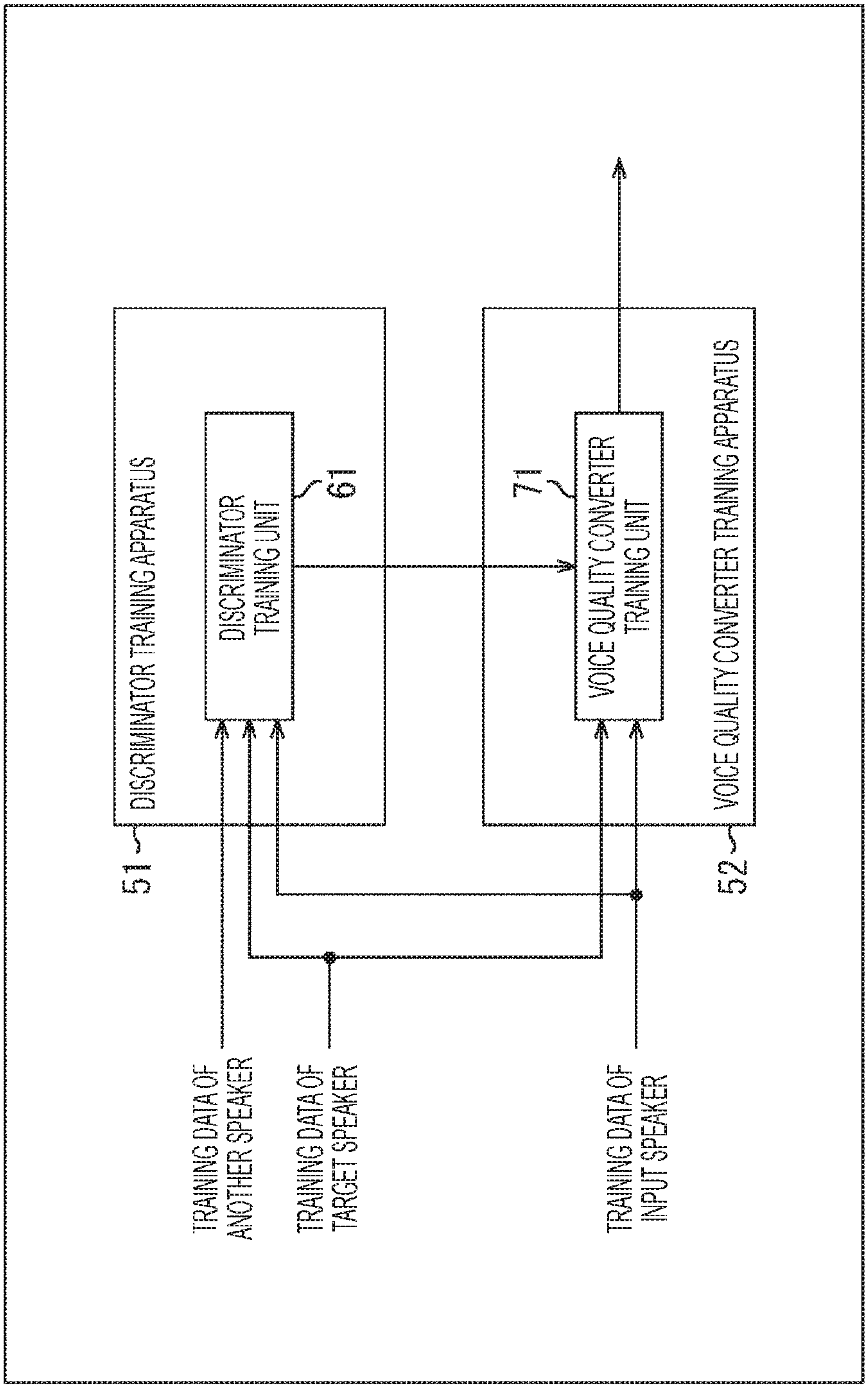
FIG. 4 is a diagram illustrating a configuration example of a discriminator training apparatus and a voice quality converter training apparatus.

For example, as illustrated in FIG. 4, for the training of the voice quality converter by the first voice quality converter training method, a discriminator training apparatus that trains a speaker discriminator that discriminates a speaker (sound source) of a voice based on the input acoustic data and a voice quality converter training apparatus that trains a voice quality converter using a speaker discriminator are required.

In the example illustrated in FIG. 4, there are a discriminator training apparatus 51 and a voice quality converter training apparatus 52.

The discriminator training apparatus 51 has a discriminator training unit 61, and the voice quality converter training apparatus 52 has a voice quality converter training unit 71.

Here, training data of one or more speakers including at least training data of the target speaker is supplied to the discriminator training unit 61. For example, as training data, training data of the target speaker and training data of another speaker different from the target speaker and the input speaker are supplied to the discriminator training unit 61. Furthermore, the discriminator training unit 61 may be supplied with training data of the input speaker. The training data supplied to the discriminator training unit 61 is generated by the training data generation apparatus 11 described above.

Note that, in some cases, the training data supplied to the discriminator training unit 61 may not include the training data of the input speaker or the training data of the target speaker. In such a case, the training data of the input speaker and the training data of the target speaker are supplied to the voice quality converter training unit 71.

Furthermore, more specifically, in a case where the training data is supplied to the discriminator training unit 61, the training data is supplied in a state where the speaker ID and the training data are associated with each other so that it is possible to specify for which speaker the training data is.

The discriminator training unit 61 trains the speaker discriminator on the basis of the supplied training data, and supplies the speaker discriminator obtained by the training to the voice quality converter training unit 71.

Note that, more specifically, in training of the speaker discriminator, parameters used for speaker discrimination (hereinafter, also referred to as speaker discriminator parameters) are obtained. As an example, for example, when the speaker discriminator is constituted by a predetermined function, the coefficient of the function is a speaker discriminator parameter.

Furthermore, the training data of the input speaker is supplied to the voice quality converter training unit 71 of the voice quality converter training apparatus 52.

The voice quality converter training unit 71 trains a voice quality converter, that is, a voice quality converter parameter, on the basis of the supplied input speaker training data and the speaker discriminator supplied from the discriminator training unit 61, and outputs the voice quality converter obtained by training to a subsequent stage.

Note that the training data of the target speaker may be supplied to the voice quality converter training unit 71 as necessary. The training data supplied to the voice quality converter training unit 71 is generated by the training data generation apparatus 11 described above.

Here, the first voice quality converter training method will be described in more detail.

In the first voice quality converter training method, first, a speaker discriminator is constructed (generated) by training using training data.

For example, a neural network or the like can be used for constructing a speaker discriminator, that is, for training the speaker discriminator. When training the speaker discriminator, a more accurate speaker discriminator can be obtained if the number of speakers in the training data is larger.

When training a speaker discriminator (speaker discrimination network), the speaker discriminator receives training data, which is the separated voice by sound source separation, and is trained to output a posterior probability of the speaker of the training data, that is, a posterior probability of the speaker ID. Therefore, a speaker discriminator that discriminates the speaker of the voice based on the input acoustic data is obtained.

After training such a speaker discriminator, it is only necessary to have training data of the input speaker, and thus it is not necessary to hold training data of other speakers. However, it is preferable to hold not only the training data of the input speaker but also the training data of the target speaker after the training of the speaker discriminator.

Furthermore, a neural network or the like can be used for construction of a voice quality converter (voice quality conversion network) that is a voice quality conversion model, that is, training of the voice quality converter.

For example, when training a voice quality converter, a speaker discriminator, a voice discriminator that performs voice recognition (voice discrimination) in predetermined units such as phonemes in an utterance, and a pitch discriminator that discriminates a pitch are used to define an invariant and a conversion amount before and after the voice quality conversion, and the voice quality converter is trained.

In other words, the voice quality converter is trained using, for example, an objective function L including the speaker discriminator, the voice discriminator, and the pitch discriminator. Here, as an example, it is assumed that a phoneme discriminator is used as a voice discriminator.

In such a case, the objective function L, that is, the loss function, can be expressed as indicated in the following Equation (1) using speaker discrimination loss $L_{speakerID}$, phoneme discrimination loss $L_{phoneme}$, pitch loss $L_{pitch}$, and regularization term $L_{reguralization}$.

[Math. 1]

$$L=\lambda_{speaker\ ID}L_{speaker\ ID}+\lambda_{phoneme}L_{phoneme}+\lambda_{pitch}L_{pitch}++\lambda_{reguralization}L_{reguralization} \quad (1)$$

Note that, in Equation (1), $\lambda_{speakerID}$, $\lambda_{phoneme}$, $\lambda_{pitch}$, and $\lambda_{reguralization}$ represent weighting factors, and these weighting factors are simply referred to as weighting factor $\lambda$ in a case where there is no particular need to distinguish these weighting factors.

Here, a voice (target voice) based on the training data of the input speaker is referred to as an input separated voice $V^{input}$, and a voice quality converter is referred to as F.

Furthermore, the voice obtained by performing voice quality conversion on the input separated voice $V^{input}$ by the voice quality converter F is F ($V^{input}$) the speaker discriminator is $D^{speakerID}$, and the index indicating the value of the speaker ID is i.

In this case, the output posterior probability $p^{input}$ when the voice F($V^{input}$) obtained by the voice quality conversion is input to the speaker discriminator $D^{speakerID}$ is expressed by the following Equation (2).

[Math. 2]

$$p^{input}=(p_i^{input}|i=1, \ldots ,N)=D^{speakerID}(F(V^{input})) \quad (2)$$

Note that, in Equation (2), N indicates the number of speakers of the training data (the number of speakers) used for training the speaker discriminator $D^{speakerID}$. Furthermore, $p_i^{input}$ indicates an i-th dimension output when the input separated voice $V^{input}$ of the input speaker is input to the speaker discriminator $D^{speakerID}$, that is, the posterior probability that the value of the speaker ID is the speaker of i.

Moreover, using the output posterior probability $p^{input}$ and the posterior probability $p^{target}$ of the target speaker indicated in the following Equation (3), the speaker discrimination loss $L_{speakerID}$ in the Equation (1) can be expressed as indicated in the following Equation (4).

[Math. 3]

$$p^{target}=(p_i^{target}|i=1, \ldots ,N) \quad (3)$$

[Math. 4]

$$L_{speakerID}=d(p^{input},p^{target}) \quad (4)$$

Note that, in Equation (4), d(p,q) is a distance or a pseudo distance between probability density functions p and q. As the distance or pseudo distance indicated by d(p,q), for example, l1 norm which is the sum of absolute values of outputs of each dimension, l2 norm which is the sum of squares of outputs of each dimension, Kullback Leibler (KL) divergence, or the like can be used.

Furthermore, assuming that the value of the speaker ID of the target speaker is i=k, in a case where the training data of the target speaker having the speaker ID of k is used as training data when training the speaker discriminator $D^{speakerID}$, it is only required that the posterior probability $p_i^{target}$ in Equation (3) be set as indicated in the following Equation (5).

[Math. 5]

$$p_i^{target}=\begin{cases}1 & i=k\\0 & \text{otherwise}\end{cases} \quad (5)$$

In this case, training data of the target speaker whose speaker ID is k is unnecessary for training of the voice quality converter F. For example, it is only required that a user or the like specify the training data of the input speaker and the value k of the speaker ID of the target speaker with respect to the voice quality converter training apparatus 52 That is, in training the voice quality converter F, only training data of the input speaker is used as training data.

On the other hand, in a case where the training data of the target speaker whose speaker ID is k is not used as training data when training the speaker discriminator $D^{speakerID}$, an average of output obtained when the separated voice of the target speaker, that is, the training data of the target speaker is input to the speaker discriminator $D^{speakerID}$ can be used as the posterior probability $p^{target}$.

In such a case, the training data of the target speaker is required as training data used for training the voice quality converter F. That is, the training data of the target speaker is supplied to the voice quality converter training unit 71. Note that, in this case, the training of the speaker discriminator $D^{speakerID}$ can be performed only with the training data of another speaker different from the input speaker and the target speaker, for example.

The speaker discrimination loss $L_{speakerID}$ obtained by Equation (4) is a term for making the voice quality of the voice based on the output acoustic data obtained by the voice quality conversion close to the voice quality of the voice of the actual target speaker.

Furthermore, the phoneme discrimination loss $L_{phoneme}$ in Equation (1) is a term for guaranteeing intelligibility that the utterance content remains unchanged before and after the voice quality conversion.

For example, an acoustic model used in voice recognition or the like can be adopted as a phoneme discriminator used for calculating the phoneme discrimination loss $L_{phoneme}$, and such a phoneme discriminator can be configured by, for example, a neural network. Note that, hereinafter, the phoneme discriminator is indicated as $D^{phoneme}$. The phonemes are invariants before and after voice quality conversion when training the voice quality converter F. In other words, the voice quality converter F is trained so that the voice quality conversion in which the phoneme is invariant is performed, that is, the same phoneme is held after the voice quality conversion.

For example, as indicated in the following Equation (6), the phoneme discrimination loss $L_{phoneme}$ can be defined as an output distance at the time when each of the input separated voice $V^{input}$ and the voice F ($V^{input}$) which are the voices before and after the voice quality conversion is input to the phonemic discriminator $D^{phoneme}$.

[Math. 6]

$$L_{phoneme}=d(D^{phoneme}(V^{input}),D^{phoneme}(F(V^{input}))) \quad (6)$$

Note that, in Equation (6), d(p,q) is the distance or pseudo distance between the probability density functions p and q, similarly to the case of Equation (4), such as 11 norm, 12 norm, KL divergence, or the like.

Moreover, the pitch loss $L_{pitch}$ in Equation (1) is a loss term for a change in pitch before and after voice quality conversion and can be defined using, for example, a pitch discriminator that is a pitch detection neural network as indicated in the following Equation (7).

[Math. 7]

$$L_{pitch}=d(D^{pitch}(V^{input}),D^{pitch}(F(V^{input}))) \quad (7)$$

Note that, in Equation (7), $D^{pitch}$ represents a pitch discriminator. Furthermore, d(p,q) is a distance or a pseudo distance between the probability density functions p and q, similarly to the case of Equation (4), and can be, for example, 11 norm, 12 norm, KL divergence, or the like.

The pitch loss $L_{pitch}$ indicated by Equation (7) is an output distance when each of the input separated voice $V^{input}$ and the voice F ($V^{input}$) which are the voices before and after the voice quality conversion, is input to the pitch discriminator $D^{pitch}$.

Note that, in training the voice quality converter F, the pitch can be an invariant or a conversion amount (variable) before and after the voice quality conversion depending on the value of the weighting factor $\lambda_{pitch}$ in Equation (1). In other words, the voice quality converter F is trained so that voice quality conversion in which the pitch is invariant or conversion amount is performed depending on the value of the weighting factor $\lambda_{pitch}$.

The regularization term $L_{reguralization}$ in Equation (1) is a term for preventing the voice quality after voice quality conversion from being significantly degraded and for facilitating training of the voice quality converter F. For example, the regularization term $L_{reguralization}$ can be defined as indicated in the following Equation (8).

[Math. 8]

$$L_{reguralization}=d(V^{target},F(V^{target})) \quad (8)$$

In Equation (8), $V^{target}$ indicates a voice (target voice) based on the training data of the target speaker, that is, a separated voice. Furthermore, d(p,q) is a distance or a pseudo distance between the probability density functions p and q, similarly to the case of Equation (4), and can be, for example, 11 norm, 12 norm, KL divergence, or the like.

The regularization term $L_{reguralization}$ indicated by Equation (8) is the distance between the separated voice $V^{target}$ and the voice F ($V^{target}$) which are the voices before and after the voice quality conversion.

Note that, in some cases, when the user or the like specifies only the speaker ID of the target speaker for the voice quality converter training apparatus 52, the voice of the target speaker cannot be used for training the voice quality converter, for example, in the use case in which the training data of the target speaker is not held, that is, the use case in which the training data of the target speaker is not supplied to the voice quality converter training unit 71.

In such a case, for example, the regularization term $L_{reguralization}$ may be defined as indicated in the following Equation (9).

[Math. 9]

$$L_{reguralization}=d(V^{input},F(V^{input})) \quad (9)$$

In Equation (9), d(p,q) is a distance or a pseudo distance between the probability density functions p and q, similarly to the case of Equation (4), for example, 11 norm, 12 norm, KL divergence, or the like.

The regularization term $L_{reguralization}$ indicated by Equation (9) is the distance between the input separated voice $V^{input}$ and the voice F ($V^{input}$) which are the voices before and after the voice quality conversion.

Moreover, each weighting factor λ in Equation (1) is determined by a use case, a desired voice quality (sound quality), and the like.

Specifically, for example, in the case where it is not necessary to hold the pitch of the output voice, that is, the pitch of the voice based on the output acoustic data, as in a voice agent, the value of the weighting factor $\lambda_{pitch}$ can be set to 0.

Conversely, for example, in a case where the vocal of a song is used as the input speaker and the voice quality of the vocal voice is changed, the pitch is an important voice quality. Therefore, a larger value is set as the value of the weighting factor $\lambda_{pitch}$.

Furthermore, in a case where the pitch discriminator $D^{pitch}$ cannot be used in the voice quality converter training unit 71, the value of the weighting factor $\lambda_{pitch}$ is set to 0, and the value of the weighting factor $\lambda_{reguralization}$ is set to a larger value, so that the regularization term $L_{reguralization}$ can replace the pitch discriminator $D^{pitch}$.

The voice quality converter training unit 71 can train the voice quality converter F by using an error back propagation method so as to minimize the objective function L indicated in Equation (1). Therefore, the voice quality converter F for converting voice quality by changing a pitch or the like while maintaining the phoneme or the like, that is, the voice quality converter parameter is obtained.

In particular, in this case, the utterance content of the voice based on the training data of the input speaker need not be the same as the utterance content of the voice based on the training data of the target speaker. That is, parallel data is not required for training the voice quality converter F. Therefore, the voice quality converter F can be obtained more easily by using training data that is relatively easily available.

By using the voice quality converter F obtained in this way, the input acoustic data of the input speaker of an arbitrary utterance content can be converted into output acoustic data of the voice quality of the target speaker having the same utterance content as that utterance content. That is, the voice of the input speaker can be converted into the voice of the voice quality of the target speaker.

<Description of Speaker Discriminator Training Processing and Voice Quality Converter Training Processing>

Next, the operations of the discriminator training apparatus 51 and the voice quality converter training apparatus 52 illustrated in FIG. 4 will be described.

Figure 5:
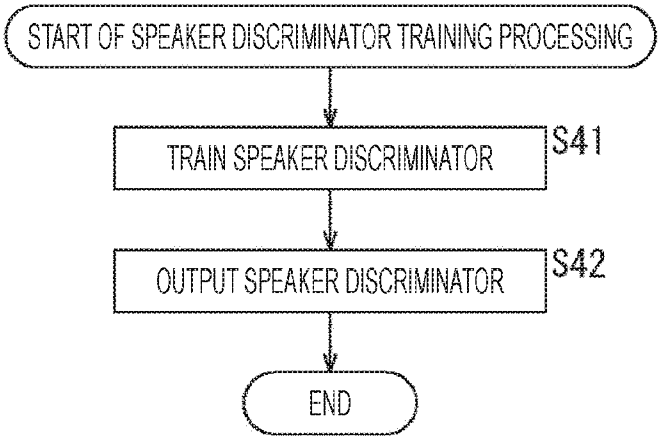
FIG. 5 is a flowchart explaining speaker discriminator training processing.

First, the speaker discriminator training processing performed by the discriminator training apparatus 51 will be described with reference to the flowchart in FIG. 5.

In step S41, the discriminator training unit 61 trains a speaker discriminator $D^{speakerID}$, that is, a speaker discriminator parameter, using, for example, a neural network or the like on the basis of the supplied training data. At this time, the training data used for training the speaker discriminator $D^{speakerID}$ is the training data generated by the training data generation processing of FIG. 3.

In step S42, the discriminator training unit 61 outputs the speaker discriminator $D^{speakerID}$ obtained by the training to the voice quality converter training unit 71, and the speaker discriminator training processing ends.

Note that in a case where the training data used for training the speaker discriminator $D^{speakerID}$ includes the training data of the target speaker, the discriminator training unit 61 also supplies the speaker ID of the target speaker to the voice quality converter training unit 71.

As described above, the discriminator training apparatus 51 performs training on the basis of the supplied training data, and generates the speaker discriminator $D^{speakerID}$.

When training the speaker discriminator $D^{speakerID}$ the speaker discriminator $D^{speakerID}$ can be easily obtained by using the training data obtained by sound source separation without requiring clean data or parallel data. That is, an appropriate speaker discriminator $D^{speakerID}$ can be obtained from easily available training data. Therefore, the voice quality converter F can be obtained more easily using the speaker discriminator $D^{speakerID}$.

Next, the voice quality converter training processing performed by the voice quality converter training apparatus 52 will be described with reference to the flowchart in FIG. 6.

In step S71, the voice quality converter training unit 71 trains the voice quality converter F, that is, a voice quality converter parameter on the basis of the supplied training data, and the speaker discriminator $D^{speakerID}$ and the speaker ID of the target speaker, which are supplied from the discriminator training unit 61. At this time, the training data used for training of the voice quality converter F is the training data generated by the training data generation processing of FIG. 3.

For example, in step S71, the voice quality converter training unit 71 trains the voice quality converter F by the error back propagation method so as to minimize the objective function L indicated in the above Equation (1). In this case, for example, only the training data of the input speaker is used as the training data, and the one indicated in Equation (5) is used as the posterior probability $p_i^{target}$.

Note that in a case where the speaker ID of the target speaker is not supplied from the discriminator training unit 61 and the training data of the target speaker is supplied from the outside, for example, the average of the output when each of a plurality of training data of the target speaker is input to the speaker discriminator $D^{speakerID}$ is used as the posterior probability $p^{target}$.

In step S72, the voice quality converter training unit 71 outputs the voice quality converter F obtained by the training to a subsequent stage, and the voice quality converter training processing ends.

As described above, the voice quality converter training apparatus 52 performs training on the basis of the supplied training data and generates the voice quality converter F.

At the time of training the voice quality converter F, the voice quality converter F can be easily obtained using the training data obtained by sound source separation without requiring clean data or parallel data. That is, an appropriate voice quality converter F can be obtained from easily available training data.

Besides, in this example, when training the voice quality converter F with the speaker discriminator $D^{speakerID}$ obtained, it is not necessary to hold a large amount of training data. Therefore, the voice quality converter F can be easily obtained offline.

<Configuration Example of Voice Quality Conversion Apparatus>

When the voice quality converter F is obtained as described above, using the obtained voice quality converter F, the input acoustic data of the input speaker of arbitrary utterance content can be converted into output acoustic data of the voice quality of the target speaker of the same utterance content.

Figure 7:
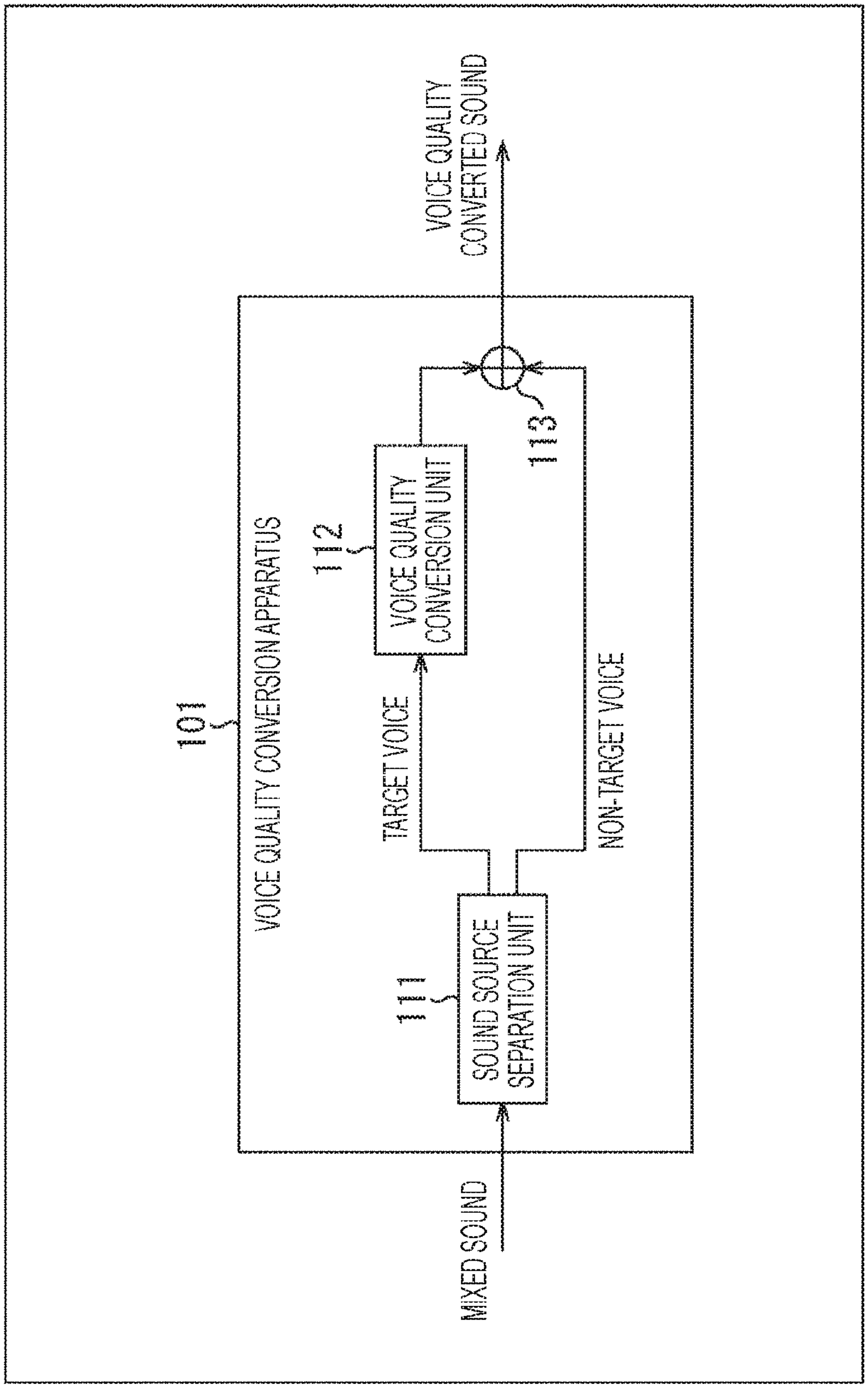
FIG. 7 is a diagram illustrating a configuration example of a voice quality conversion apparatus.

A voice quality conversion apparatus that performs voice quality conversion using the voice quality converter F is configured, for example, as illustrated in FIG. 7.

The voice quality conversion apparatus 101 illustrated in FIG. 7 is a signal processing apparatus that is provided, for example, in various terminal apparatuses (electronic devices) such as a smartphone, a personal computer, and a network speaker used by a user, and performs voice quality conversion on input acoustic data.

The voice quality conversion apparatus 101 includes a sound source separation unit 111, a voice quality conversion unit 112, and an adding unit 113.

To the sound source separation unit 111, acoustic data of a mixed sound including the voice of the input speaker and a non-target voice such as noise or music other than the voice of the input speaker is externally supplied. Note that the acoustic data supplied to the sound source separation unit 111 is not limited to the acoustic data of the mixed sound, but may be any kind of acoustic data, e.g., acoustic data of clean speech of the input speaker, that is, the clean data of the voice of the input speaker.

The sound source separation unit 111 includes, for example, a sound source separator designed in advance, and performs sound source separation on the supplied acoustic data of the mixed sound to separate the acoustic data of the mixed sound into the voice of the input speaker, that is, the acoustic data of the target voice, and the acoustic data of the non-target voice.

The sound source separation unit 111 supplies the acoustic data of the target voice obtained by the sound source separation to the voice quality conversion unit 112 as the input acoustic data of the input speaker, and supplies the acoustic data of the non-target voice obtained by the sound source separation to the adding unit 113.

The voice quality conversion unit 112 preliminarily holds the voice quality converter F supplied from the voice quality converter training unit 71. The voice quality conversion unit 112 performs voice quality conversion on the input acoustic data supplied from the sound source separation unit 111 using the held voice quality converter F, that is, the voice quality converter parameter, and supplies the resultant output acoustic data of the voice of the voice quality of the target speaker to the adding unit 113.

The adding unit 113 adds the output acoustic data supplied from the voice quality conversion unit 112 and the acoustic data of the non-target voice supplied from the sound source separation unit 111, thereby synthesizing the voice of the voice quality of the target speaker and the non-target voice to make final output acoustic data and outputs it to a recording unit, a speaker, or the like at a subsequent stage. In other words, the adding unit 113 functions as a synthesizing unit that synthesizes the output acoustic data supplied from the voice quality conversion unit 112 and the acoustic data of the non-target voice supplied from the sound source separation unit 111 to generate final output acoustic data.

The sound based on the final output acoustic data obtained in this way is a mixed sound including the voice of the voice quality of the target speaker and the non-target voice.

Therefore, for example, it is assumed that the target voice is a voice of the input speaker singing a predetermined music, and the non-target voice is a sound of the accompaniment of the music. In this case, the sound based on the output acoustic data obtained by the voice quality conversion is a mixed sound including the voice of the target speaker singing the music and the sound of the accompaniment of the music, which is the non-target voice. Note that, for example, when the target speaker is a music instrument, the original song is converted into an instrumental (instrumental music) by voice quality conversion.

Incidentally, it is preferable that the sound source separator constituting the sound source separation unit 111 be the same as the sound source separator constituting the sound source separation unit 21 of the training data generation apparatus 11.

Furthermore, in sound source separation by the sound source separator, a specific spectrum change can occur in acoustic data. Therefore, since sound source separation is performed in the generation of the training data here, regardless of whether the sound based on the acoustic data supplied to the voice quality conversion apparatus 101 is a mixed sound or a clean speech, it is desirable that the sound source separation unit 111 performs sound source separation on the acoustic data also in the voice quality conversion apparatus 101.

Conversely, since the sound source separation is performed in the voice quality conversion apparatus 101, when the training data is generated, even in a case where the acoustic data supplied to the sound source separation unit 21 is clean data, it is desirable that sound source separation be performed on the acoustic data in the sound source separation unit 21.

In this way, the probability distributions of occurrence of the input voice (target voice) at the time of voice quality conversion and the input voice (target voice) at the time of training of the voice quality converter F can be matched, and it is possible to perform voice quality conversion using only mixed sounds even when the sound source separator is not ideal.

Furthermore, the sound source separation unit 111 separates the mixed sound into the target voice, which is the voice of the input speaker, and the non-target voice, so that voice quality conversion can be performed on the mixed sound including noise or the like. For example, when voice quality conversion is performed only on the target voice and the resulting voice is synthesized with the non-target voice, voice quality conversion can be performed while maintaining the context such as background sound, and it is possible to avoid extreme sound quality degradation even in a case where the result of the sound source separation is not perfect.

Moreover, when the voice quality converter F is obtained by the training by the voice quality converter training apparatus 52 described above, the voice quality conversion apparatus 101 does not need to hold a model or data other than the voice quality converter F. Therefore, the training of the voice quality converter F can be performed in the cloud, and the actual voice quality conversion using the voice quality converter F can be performed in the embedded device.

In this case, the voice quality conversion apparatus 101 is provided in the embedded device, and it is only required that the training data generation apparatus 11, the discriminator training apparatus 51, and the voice quality converter training apparatus 52 be provided in an apparatus such as a server constituting the cloud.

In this case, some of the training data generation apparatus 11, the discriminator training apparatus 51, and the voice quality converter training apparatus 52 may be provided in the same apparatus, or the training data generation apparatus 11, the discriminator training apparatus 51, and the voice quality converter training apparatus 52 may be provided in different apparatuses.

Furthermore, some or all of the training data generation apparatus 11, the discriminator training apparatus 51, and the voice quality converter training apparatus 52 may be provided in the embedded device such as a terminal apparatus provided with the voice quality conversion apparatus 101.

<Description of Voice Quality Conversion Processing>

Next, the operation of the voice quality conversion apparatus 101 illustrated in FIG. 7 will be described.

Figure 8:
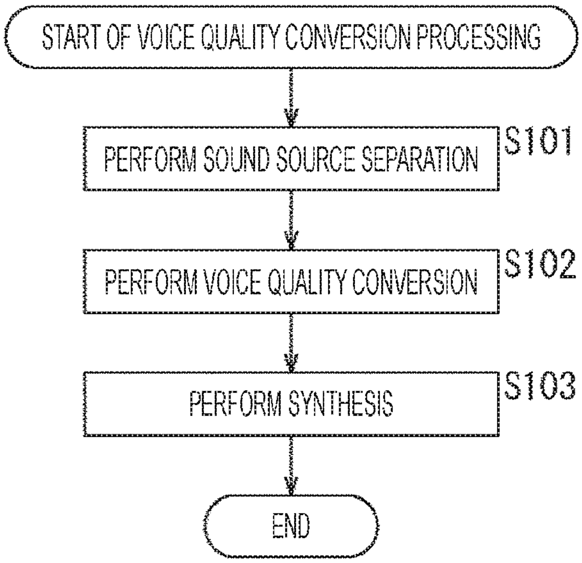
FIG. 8 is a flowchart explaining voice quality conversion processing.

That is, the voice quality conversion processing by the voice quality conversion apparatus 101 will be described below with reference to the flowchart in FIG. 8.

In step S101, the sound source separation unit 111 performs sound source separation on the supplied acoustic data of the mixed sound including the voice (target voice) of the input speaker. The sound source separation unit 111 supplies the acoustic data of the target sound obtained by the sound source separation to the voice quality conversion unit 112 as the input acoustic data of the input speaker, and supplies the acoustic data of the non-target voice obtained by the sound source separation to the adding unit 113.

In step S102, the voice quality conversion unit 112 performs voice quality conversion on the input acoustic data supplied from the sound source separation unit 111 using the held voice quality converter F, and supplies the resultant output acoustic data of the voice of the voice quality of the target speaker to the adding unit 113.

In step S103, the adding unit 113 synthesizes the output acoustic data supplied from the voice quality conversion unit 112 and the acoustic data of the non-target voice supplied from the sound source separation unit 111 by means of addition, and generates the final output acoustic data.

The adding unit 113 outputs the output acoustic data thus obtained to a recording unit, a speaker, or the like at a subsequent stage, and the voice quality conversion processing ends. In the subsequent stage of the adding unit 113, for example, the supplied output acoustic data is recorded on a recording medium, or a sound is reproduced on the basis of the supplied output acoustic data.

As described above, the voice quality conversion apparatus 101 performs sound source separation on the supplied acoustic data, then performs voice quality conversion on the acoustic data of the target voice, and synthesizes the resultant output acoustic data and the acoustic data of the non-target voice to obtain the final output acoustic data. In this way, voice quality conversion can be performed more easily even in a situation where parallel data and clean data are not sufficiently available.

Second Embodiment

<Regarding Training the Voice Quality Converter>

Furthermore, in the above, an example in which the voice quality converter is trained by the speaker discriminator-based, first voice quality converter training method has been described. However, for example, in a case where a sufficient amount of training data of the voices of the target speaker and the input speaker can be held at the time of training the voice quality converter, the voice quality converter can be trained only from the training data of the target speaker and the input speaker without using a pre-trained model such as the above-described speaker discriminator.

Hereinafter, a case where adversarial training is performed will be described as an example of training a voice quality converter without using a pre-trained model in a case where there is a sufficient amount of training data of a target speaker and an input speaker. Note that the training method based on the adversarial training described below is also referred to as a second voice quality converter training method. The training of the voice quality converter by the second voice quality converter training method is performed, for example, online.

In the second voice quality converter training method, in particular, the input speaker is also referred to as speaker 1, and a voice based on the training data of the speaker 1 is referred to as a separated voice $V_1$. Furthermore, the target speaker is also referred to as speaker 2, and a voice based on the training data of the speaker 2 is referred to as a separated voice $V_2$.

In the second voice quality converter training method, that is, the adversarial training, the speaker 1 and the speaker 2 are symmetric with each other, and the voice quality can be mutually converted.

Now, a voice quality converter that converts the voice of the speaker 1 into the voice of the voice quality of the speaker 2 is $F_{12}$, a voice quality converter that converts the voice of the speaker 2 into the voice of the voice quality of the speaker 1 is $F_{21}$, and it is assumed that voice quality converter $F_{12}$ and voice quality converter $F_{21}$ are configured by a neural network. These voice quality converters $F_{12}$ and $F_{21}$ are mutual voice quality conversion models.

In such a case, the objective function L for training the voice quality converter $F_{12}$ and the voice quality converter $F_{21}$ can be defined as indicated in the following Equation (10).

[Math. 10]

$$L=\lambda^{id}L_1^{id}+\lambda^{id}+L_2^{id}+\lambda^{adv}L_1^{adv}+\lambda^{adv}L_2^{adv} \quad (10)$$

Note that, in Equation (10), $\lambda^{id}$ and $\lambda^{adv}$ indicate weighting factors, and these weighting factors are also simply referred to as weighting factor λ in a case where there is no particular need to distinguish these weighting factors.

Furthermore, in Equation (10), $L_1^{id}$ and $L_2^{id}$ are indicated by the following Equations (11) and (12), respectively.

[Math. 11]

$$L_1^{id}=d(V_1,V_1')=d(V_1,F_{21}(F_{12}(V_1))) \quad (11)$$

[Math. 12]

$$L_2^{id}=d(V_2,V_2')=d(V_2,F_{12}(F_{21}(V_2))) \quad (12)$$

In Equation (11), the voice (acoustic data) obtained by converting the separated voice $V_1$ of the speaker 1 into the voice of the voice quality of the speaker 2 by the voice quality converter $F_{12}$ is referred to as voice $F_{12}(V_1)$. Furthermore, the voice (acoustic data) obtained by converting the voice $F_{12}(V_1)$ into the voice of the voice quality of the speaker 1 by the voice quality converter $F_{21}$ is referred to as voice $F_{21}(F_{12}(V_1))$ or voice $V_1'$. That is, $V_1'=F_{21}(F_{12}(V_1))$.

Therefore, $L_1^{id}$ indicated by Equation (11) is defined using the distance between the original separated voice $V_1$ before the voice quality conversion and the voice $V_1'$ converted to the voice of the voice quality of the original speaker 1 by further voice quality conversion after voice quality conversion.

Similarly, in Equation (12), the voice (acoustic data) obtained by converting the separated voice $V_2$ of the speaker 2 into the voice of the voice quality of the speaker 1 by the voice quality converter $F_{21}$ is referred to as voice $F_{21}(V_2)$. Furthermore, the voice (acoustic data) obtained by converting the voice $F_{21}(V_2)$ into the voice of the voice quality of the speaker 2 by the voice quality converter $F_{12}$ is referred to as voice $F_{12}(F_{21}(V_2))$ or voice $V_2'$. That is, $V_2'=F_{12}(F_{21}(V_2))$.

Therefore, $L_2^{id}$ indicated by Equation (12) is defined using the distance between the original separated voice $V_2$ before voice quality conversion and the voice $V_2'$ converted to the voice of the voice quality of the original speaker 2 by further voice quality conversion after voice quality conversion.

Note that, in Equations (11) and (12), d(p,q) is a distance or a pseudo distance between the probability density functions p and q, and can be, for example, an l1 norm or an l2 norm.

Ideally, the voice $V_1'$ should be the same as the separated voice $V_1$. Therefore, it can be seen that the smaller the $L_1^{id}$, the better. Similarly, ideally, the voice $V_2'$ also should be the same as the separated voice $V_2$. Therefore, it can be seen that the smaller the $L_2^{id}$, the better.

Furthermore, $L_1^{adv}$ and $L_2^{adv}$ in Equation (10) are adversarial loss terms.

Here, a discrimination network that discriminates (determines) whether the input is a separated voice before voice quality conversion or a voice after voice quality conversion is referred to as $D_i$ (where i=1,2). The discrimination network $D_i$ is configured by, for example, a neural network.

For example, the discrimination network $D_1$ is a discriminator that discriminates whether the voice (acoustic data) input to the discrimination network $D_1$ is the true separated voice $V_1$ or the voice $F_{21}$ ($V_2$). Similarly, the discrimination network $D_2$ is a discriminator that discriminates whether the voice (acoustic data) input to the discrimination network $D_2$ is the true separated voice $V_2$ or the voice $F_{12}$ ($V_1$).

At this time, for example, the adversarial loss term $L_1^{adv}$ and the adversarial loss term $L_2^{adv}$ can be defined as indicated in the following Equations (13) and (14), respectively, using cross entropy.

[Math. 13]

$$L_1^{adv}=E_{V1}[\log D_1(V_1)]+E_{V2}[\log(1-D_1(F_{21}(V_2)))] \quad (13)$$

[Math. 14]

$$L_2^{adv}=E_{V2}[\log D_2(V_2)]+E_{V1}[\log(1-D(F_{12}(V_1)))] \quad (14)$$

Note that, in Equations (13) and (14), $E_{V1}[\ ]$ indicates the utterance of the speaker 1, that is, an expected value (average value) for the separated voice $V_1$, and $E_{V2}[\ ]$ indicates the utterance of the speaker 2, that is, an expected value (average value) for the separated voice $V_2$.

The training of the voice quality converter $F_{12}$ and the voice quality converter $F_{21}$ is performed so as to fool the discrimination network $D_1$ and the discrimination network $D_2$.

For example, focusing on the adversarial loss term $L_1^{adv}$, from the viewpoint of the voice quality converter $F_{21}$, since it is desired to obtain a voice quality converter $F_{21}$ with higher performance by training, it is preferable that the voice quality converter $F_{21}$ be trained such that the discrimination network $D_1$ cannot correctly discriminate the separated voice $V_1$ and the voice $F_{21}(V_2)$. In other words, it is favorable that the voice quality converter $F_{21}$ be trained so that the adversarial loss term $L_1^{adv}$ is small.

However, from the viewpoint of the discrimination network $D_1$, in order to obtain a voice quality converter $F_{21}$ with higher performance, it is preferable to obtain a discrimination network $D_i$ with higher performance, that is, a higher discrimination ability, by training. In other words, it is preferable that the discrimination network $D_1$ be trained such that the adversarial loss term $L_1^{adv}$ becomes large. The similar thing can be said for the adversarial loss term $L_2^{adv}$.

At the time of training the voice quality converter $F_{12}$ and the voice quality converter $F_{21}$, the voice quality converter $F_{12}$ and the voice quality converter $F_{21}$ are trained so as to minimize the objective function L indicated in the above Equation (10).

At this time, the discrimination network $D_1$ and the discrimination network $D_2$ are trained so that the adversarial loss term $L_1^{adv}$ and the adversarial loss term $L_2^{adv}$ are maximized simultaneously with the voice quality converter $F_{12}$ and the voice quality converter $F_{21}$.

Figure 9:
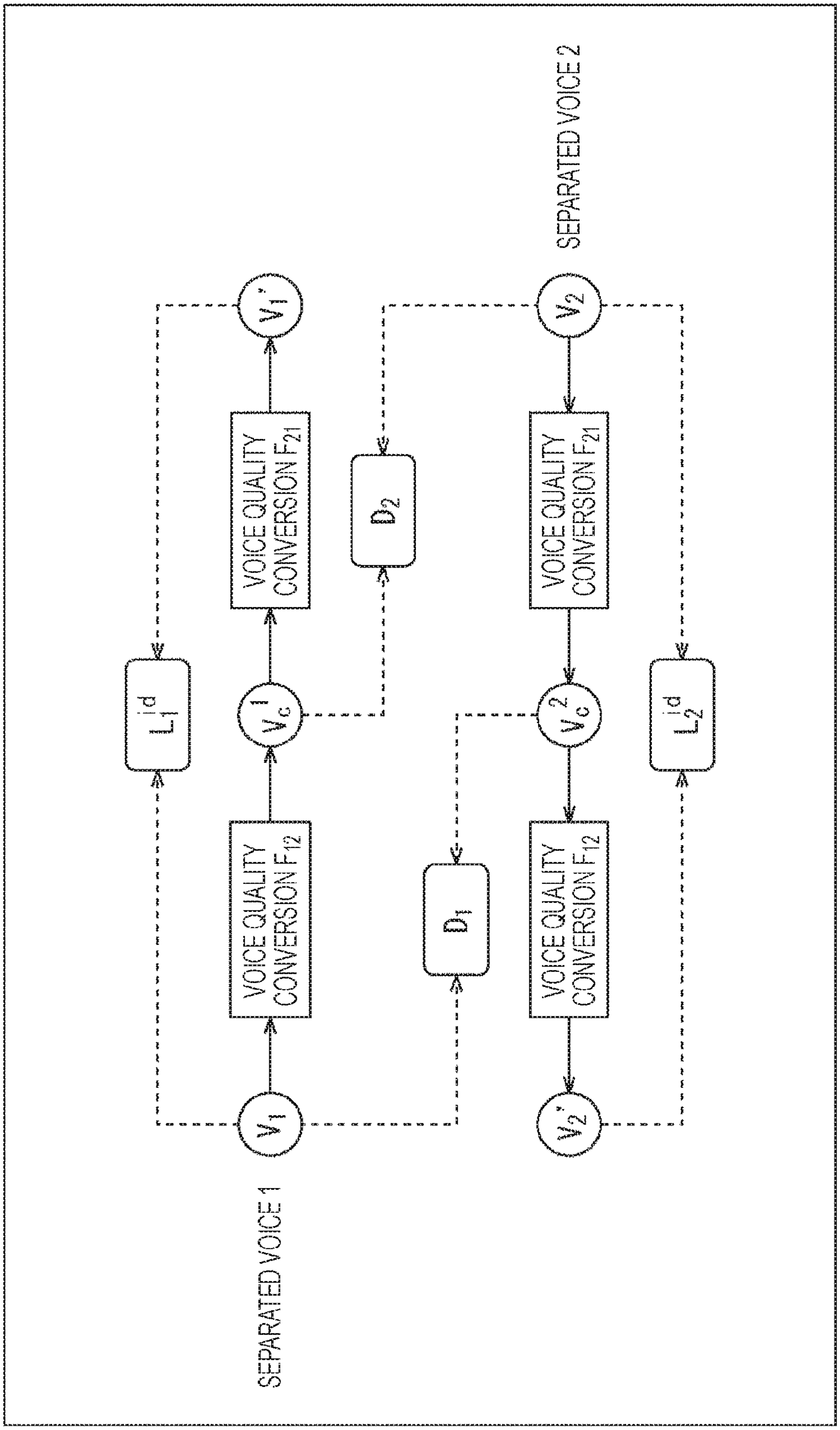
FIG. 9 is a diagram explaining adversarial training.

For example, as illustrated in FIG. 9, at the time of training, the separated voice $V_1$, which is the training data of the speaker 1, is converted by the voice quality converter $F_{12}$ into the voice $V_C^1$. Here, the voice $V_C^1$ is the voice $F_{12}(V_1)$. The voice $V_C^1$ obtained in this manner is further converted by the voice quality converter $F_{21}$ into the voice $V_1'$.

Similarly, the separated voice $V_2$, which is the training data of the speaker 2, is converted by the voice quality converter $F_{21}$ into the voice $V_C^2$. Here, the voice $V_C^2$ is the voice $F_{21}(V_2)$. The voice $V_C^2$ obtained in this way is further converted by the voice quality converter $F_{12}$ into the voice $V_2'$.

Furthermore, $L_1^{id}$ is obtained from the input original separated voice $V_1$ and the voice $V_1'$ obtained by the voice quality conversion, and $L_2^{id}$ is obtained from the input original separated voice $V_2$ and the voice $V_2'$ obtained by the voice quality conversion.

Moreover, the input original separated voice $V_1$ and the voice $V_C^2$ obtained by voice quality conversion are input (substituted) to the discrimination network $D_1$, and the adversarial loss term $L_1^{adv}$ is determined. Similarly, the input original separated voice $V_2$ and the voice $V_C^1$ obtained by voice quality conversion are input to the discrimination network $D_2$, and the adversarial loss term $L_2^{adv}$ is determined.

Then, on the basis of $L_1^{id}$, $L_2^{id}$, the adversarial loss term $L_1^{adv}$, and the adversarial loss term $L_2^{adv}$ thus obtained, the objective function L indicated in Equation (10) is determined, and the voice quality converter $F_{12}$, and the voice quality converter $F_{21}$, and the discrimination network $D_1$, and the discrimination network $D_2$ are trained such that the value of the objective function L is minimized.

Using the voice quality converter Fie obtained by the above training, it is possible to convert the acoustic data of the input speaker, which is the speaker 1, into the acoustic data of the voice of the voice quality of the target speaker, which is the speaker 2. Similarly, using the voice quality converter $F_{21}$, it is possible to convert the acoustic data of the target speaker, which is the speaker 2, into the acoustic data of the voice of the voice quality of the input speaker, which is the speaker 1.

Note that the adversarial loss term $L_1^{adv}$ and the adversarial loss term $L_2^{adv}$ are not limited to those indicated in the above Equations (13) and (14), but can also be defined using, for example, a square error loss.

In such a case, the adversarial loss term $L_1^{adv}$ and the adversarial loss term $L_2^{adv}$ are, for example, as indicated in the following Equations (15) and (16).

[Math. 15]

$$L_1^{adv}=E_{V1}[D_1(V_1)^2]+E_{V2}[(1-D_1(F_{21}(V_2)))^2] \quad (15)$$

[Math. 16]

$$L_2^{adv}=E_{V2}[D_2(V_2)^2]+E_{V2}[(1=D_2(F_{12}(V_1)))^2] \quad (16)$$

In a case where the voice quality converter training apparatus 52 trains the voice quality converter by the second voice quality converter training method described above, for example, in step S71 of FIG. 6, the voice quality converter training unit 71 performs training of the voice quality converter on the basis of the supplied training data. That is, adversarial training is performed to generate a voice quality converter.

Specifically, the voice quality converter training unit 71 minimizes the objective function L indicated in Equation (10) on the basis of the supplied training data of the input speaker and the supplied training data of the target speaker, to train the voice quality converter $F_{12}$, the voice quality converter $F_{21}$, the discrimination network $D_1$, and the discrimination network $D_2$.

Then, the voice quality converter training unit 71 supplies the voice quality converter $F_{12}$ obtained by the training to the voice quality conversion unit 112 of the voice quality conversion apparatus 101 as the above-described voice quality converter F and causes the voice quality converter $F_{12}$ to be held. If such a voice quality converter F is used, for example, the voice quality conversion apparatus 101 can convert a singing voice as the voice of the input speaker into a musical instrument sound as the voice of the target speaker.

Note that not only the voice quality converter $F_{12}$ but also the voice quality converter $F_{21}$ may be supplied to the voice quality conversion unit 112. In this way, the voice quality conversion apparatus 101 can also convert the voice of the target speaker into the voice of the voice quality of the input speaker.

As described above, also in a case where a voice quality converter is trained by the second voice quality converter training method, voice quality conversion can be performed more easily using training data that is relatively easily available.

Third Embodiment

<Regarding Training the Voice Quality Converter>

Moreover, in a case where the voice quality converter is trained by adversarial training, the training data of the target speaker and the input speaker can be held at the time of training the voice quality converter, but, in some cases, the amount of training data that can be held is not sufficient.

In such a case, the quality of the voice quality converter $F_{12}$ and the voice quality converter $F_{21}$ determined by adversarial training may be increased by using at least any one of the speaker discriminator $D^{speakerID}$, the phoneme discriminator $D^{phoneme}$, or the pitch discriminator $D^{pitch}$ used in the first voice quality converter training method. Hereinafter, such a training method is also referred to as a third voice quality converter training method.

For example, in the third voice quality converter training method, training of the voice quality converter $F_{12}$ and the voice quality converter $F_{21}$ is performed using the objective function L indicated by the following Equation (17).

[Math. 17]

$$L=\lambda^{id}L_1{}^{id}+\lambda^{id}L_2{}^{id}+\lambda^{adv}L_1{}^{adv}+\lambda^{adv}L_2{}^{adv}+\lambda_{speaker\ ID}L_{speaker\ ID}+\lambda_{phoneme}L_{phoneme}+\lambda_{pitch}L_{pitch} \quad (17)$$

The objective function L indicated in this Equation (17) is obtained by removing (subtracting) the product of the weighting factor $\lambda_{reguralization}$ and the regularization term $L_{reguralization}$ from the objective function L indicated in Equation (1) and by adding the objective function L indicated in Equation (10).

Figure 6:
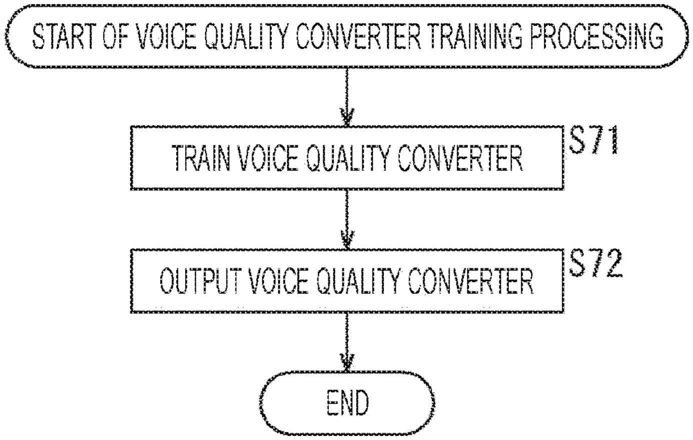
FIG. 6 is a flowchart explaining voice quality converter training processing.

In this case, for example, in step S71 of FIG. 6, the voice quality converter training unit 71 trains the voice quality converter on the basis of the supplied training data, the speaker discriminator $D^{speakerID}$ and the speaker ID of the target speaker supplied from the discriminator training unit 61.

Specifically, the voice quality converter training unit 71 trains the voice quality converter $F_{12}$, the voice quality converter $F_{21}$, the discrimination network $D_1$, and the discrimination network $D_2$ by minimizing the objective function L indicated in Equation (17), and supplies the obtained voice quality converter $F_{12}$ to the voice quality conversion unit 112 as the voice quality converter F.

As described above, also in a case where the voice quality converter is trained by the third voice quality converter training method, voice quality conversion can be performed more easily using training data that is relatively easily available.

According to the present technology described in the first embodiment to the third embodiment, even in a situation where parallel data or clean data is not sufficiently available, the training of the voice quality converter can be performed more easily using acoustic data of a mixed sound that is easily available. In other words, voice quality conversion can be performed more easily.

In particular, when training the voice quality converter, it is possible to obtain a voice quality converter from acoustic data of any utterance content without requiring acoustic data (parallel data) of the same utterance content of the input speaker and the target speaker.

Furthermore, by performing sound source separation on acoustic data at the time of generation of training data and before actual voice quality conversion using the voice quality converter, a voice quality converter having little sound quality deterioration can be configured even in a case where the performance of the sound source separator is not sufficient.

Moreover, the voice quality of the voice to be held, such as the pitch, can be adjusted by appropriately setting the weighting factor of the objective function L according to the purpose of using the voice quality conversion.

For example, it is possible to make adjustment to achieve more natural voice quality conversion, for example, by not changing the pitch in a case where the voice quality converter is used for voice quality conversion of the vocal of music and by changing the pitch in a case where the voice quality converter is used for voice quality conversion of an ordinary conversational voice.

In addition, for example, in the present technology, if a musical instrument sound is specified as a target speaker's sound, the sound of the music as the input speaker's sound can be converted into the sound of the voice quality (sound quality) of the musical instrument as the target speaker. That is, an instrumental (instrumental music) can be created from a song. In this way, the present technology can be used for, for example, back ground music (BGM) creation.

<Configuration Example of Computer>

Incidentally, the series of processing described above can be executed by hardware and it can also be executed by software. In a case where the series of processing is executed by software, a program constituting the software is installed in a computer. Here, the computer includes a computer mounted in dedicated hardware, for example, a general-purpose a personal computer that can execute various functions by installing the various programs, or the like.

Figure 10:
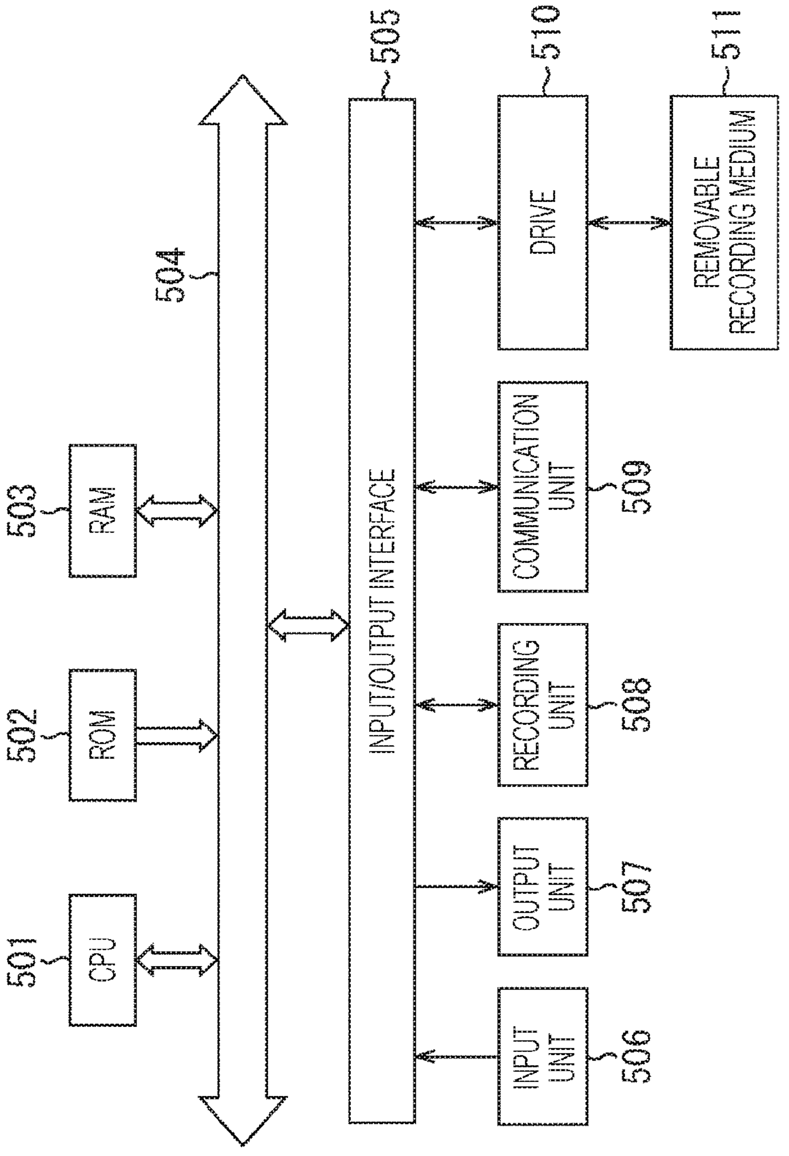
FIG. 10 is a diagram illustrating a configuration example of a computer.

FIG. 10 is a block diagram illustrating a configuration example of hardware of a computer in which the series of processing described above is executed by a program.

In the computer, a central processing unit (CPU) 501, a read only memory (ROM) 502, a random access memory (RAM) 503, are interconnected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured in the manner described above, the series of processing described above is performed, for example, such that the CPU 501 loads a program stored in the recording unit 508 into the RAM 503 via the input/output interface 505 and the bus 504 and executes the program.

The program to be executed by the computer (CPU 501) can be provided by being recorded on the removable recording medium 511, for example, as a package medium or the like. Furthermore, the program can be provided via a wired or wireless transmission medium such as a local area network, the Internet, or digital satellite broadcasting.

In the computer, the program can be installed on the recording unit 508 via the input/output interface 505 when the removable recording medium 511 is mounted on the drive 510. Furthermore, the program can be received by the communication unit 509 via a wired or wireless transmission medium and installed on the recording unit 508. In addition, the program can be pre-installed on the ROM 502 or the recording unit 508.

Note that the program executed by the computer may be a program that is processed in chronological order along the order described in the present description or may be a program that is processed in parallel or at a required timing, e.g., when call is carried out.

Furthermore, the embodiment of the present technology is not limited to the aforementioned embodiments, but various changes may be made within the scope not departing from the gist of the present technology.

For example, the present technology can adopt a configuration of cloud computing in which one function is shared and jointly processed by a plurality of apparatuses via a network.

Furthermore, each step described in the above-described flowcharts can be executed by a single apparatus or shared and executed by a plurality of apparatuses.

Moreover, in a case where a single step includes a plurality of pieces of processing, the plurality of pieces of processing included in the single step can be executed by a single device or can be divided and executed by a plurality of devices.

Moreover, the present technology may be configured as below.

(1)

A signal processing apparatus including:

a voice quality conversion unit configured to convert acoustic data of any sound of an input sound source to acoustic data of voice quality of a target sound source different from the input sound source on the basis of a voice quality converter parameter obtained by training using acoustic data for each of one or more sound sources as training data, the acoustic data being different from parallel data or clean data.

(2)

The signal processing apparatus according to (1), in which the training data includes acoustic data of a sound of the input sound source or acoustic data of a sound of the target sound source.

(3)

The signal processing apparatus according to (1) or (2), in which the voice quality converter parameter is obtained by training using the training data and a discriminator parameter for discriminating a sound source of input acoustic data obtained by training using the training data.

(4)

The signal processing apparatus according to (3), in which the training data of a sound of another sound source different from the input sound source and the target sound source is used for training the discriminator parameter.

(5)

The signal processing apparatus according to (3) or (4), in which the training data of a sound of the target sound source is used for training the discriminator parameter, and only the training data of a sound of the input sound source is used as the training data for training the voice quality converter parameter.

(6)

The signal processing apparatus according to any one of (1) to (5), in which the training data is acoustic data obtained by performing sound source separation.

(7)

The signal processing apparatus according to (6), in which the training data is acoustic data of a sound of the sound source obtained by performing sound source separation on acoustic data of a mixed sound including a sound of the sound source.

(8)

The signal processing apparatus according to (6), in which the training data is acoustic data of a sound of the sound source obtained by performing sound source separation on clean data of a sound of the sound source.

(9)

The signal processing apparatus according to any one of (1) to (8), in which the voice quality conversion unit performs the conversion in which phoneme is an invariant on the basis of the voice quality converter parameter.

(10)

The signal processing apparatus according to any one of (1) to (9), in which the voice quality conversion unit performs the conversion in which pitch is an invariant or a conversion amount on the basis of the voice quality converter parameter.

(11)

The signal processing apparatus according to any one of (1) to (10), in which the input sound source and the target sound source are a speaker, a musical instrument, or a virtual sound source.

(12)

A signal processing method, by a signal processing apparatus, including:

converting acoustic data of any sound of an input sound source to acoustic data of voice quality of a target sound source different from the input sound source on the basis of a voice quality converter parameter obtained by training using acoustic data for each of one or more sound sources as training data, the acoustic data being different from parallel data or clean data.

(13)

A program that causes a computer to execute processing including:

a step of converting acoustic data of any sound of an input sound source to acoustic data of voice quality of a target sound source different from the input sound source on the basis of a voice quality converter parameter obtained by training using acoustic data for each of one or more sound sources as training data, the acoustic data being different from parallel data or clean data.

(14)

A signal processing apparatus including:

a sound source separation unit configured to separate predetermined acoustic data into acoustic data of a target sound and acoustic data of a non-target sound by sound source separation;

a voice quality conversion unit configured to perform voice quality conversion on the acoustic data of the target sound; and a synthesizing unit configured to synthesize acoustic data obtained by the voice quality conversion and acoustic data of the non-target sound.

(15)

The signal processing apparatus according to (14), in which the predetermined acoustic data is acoustic data of a mixed sound including the target sound.

(16)

The signal processing apparatus according to (14), in which the predetermined acoustic data is clean data of the target sound.

(17)

The signal processing apparatus according to any one of (14) to (16), in which the voice quality conversion unit performs the voice quality conversion on the basis of a voice quality converter parameter obtained by training using acoustic data for each of one or more of sound sources as training data, the acoustic data being different from parallel data or clean data.

(18)

A signal processing method, by a signal processing apparatus, including:

separating predetermined acoustic data into acoustic data of a target sound and acoustic data of a non-target sound by sound source separation;

performing voice quality conversion on the acoustic data of the target sound; and synthesizing acoustic data obtained by the voice quality conversion and acoustic data of the non-target sound.

(19)

A program that causes a computer to execute processing including the steps of:

separating predetermined acoustic data into acoustic data of a target sound and acoustic data of a non-target sound by sound source separation;

performing voice quality conversion on the acoustic data of the target sound; and synthesizing acoustic data obtained by the voice quality conversion and acoustic data of the non-target sound.

(20)

A training apparatus including:

a training unit configured to train a discriminator parameter for discriminating a sound source of input acoustic data using each acoustic data for each of a plurality of sound sources as training data, the acoustic data being different from parallel data or clean data.

(21)

The training apparatus according to (20), in which the training data is acoustic data obtained by performing sound source separation.

(22)

A training method, by a training apparatus, including:

training a discriminator parameter for discriminating a sound source of input acoustic data using each acoustic data for each of a plurality of sound sources as training data, the acoustic data being different from parallel data or clean data.

(23)

A program that causes a computer to execute processing including:

a step of training a discriminator parameter for discriminating a sound source of input acoustic data using each acoustic data for each of a plurality of sound sources as training data, the acoustic data being different from parallel data or clean data.

(24)

A training apparatus including:

a training unit configured to train a voice quality converter parameter for converting acoustic data of any sound of an input sound source to acoustic data of voice quality of a target sound source different from the input sound source using acoustic data for each of one or more sound sources as training data, the acoustic data being different from parallel data or clean data.

(25)

The training apparatus according to (24), in which the training data includes acoustic data of a sound of the input sound source or acoustic data of a sound of the target sound source.

(26)

The training apparatus according to (24) or (25), in which the training unit trains the voice quality converter parameter using the training data and a discriminator parameter for discriminating a sound source of input acoustic data obtained by training using the training data.

(27)

The training apparatus according to (26), in which the training data of a sound of the target sound source is used for training the discriminator parameter, and the training unit uses only the training data of a sound of the input sound source as the training data to train the voice quality converter parameter.

(28)

The training apparatus according to any one of (24) to (27), in which the training data is acoustic data obtained by performing sound source separation.

(29)

The training apparatus according to (28), in which the training data is acoustic data of a sound of the sound source obtained by performing sound source separation on acoustic data of a mixed sound including a sound of the sound source.

(30)

The training apparatus according to (28), in which the training data is acoustic data of a sound of the sound source obtained by performing sound source separation on clean data of a sound of the sound source.

(31)

The training apparatus according to any one of (24) to (30), in which the training unit trains the voice quality converter parameter for performing the conversion in which phoneme is an invariant.

(32)

The training apparatus according to any one of (24) to (31), in which the training unit trains the voice quality converter parameter for performing the conversion in which pitch is an invariant or a conversion amount.

(33)

The training apparatus according to any one of (24) to (32), in which the training unit performs adversarial training as training of the voice quality converter parameter.

(34)

The training apparatus according to any one of (24) to (33), in which the input sound source and the target sound source are a speaker, a musical instrument, or a virtual sound source.

(35)

A training method, by a training apparatus, including:

training a voice quality converter parameter for converting acoustic data of any sound of an input sound source to acoustic data of voice quality of a target sound source different from the input sound source using acoustic data for each of one or more sound sources as training data, the acoustic data being different from parallel data or clean data.

(36)

A program that causes a computer to execute processing including:

a step of training a voice quality converter parameter for converting acoustic data of any sound of an input sound source to acoustic data of voice quality of a target sound source different from the input sound source using acoustic data for each of one or more sound sources as training data, the acoustic data being different from parallel data or clean data.

REFERENCE SIGNS LIST

11 Training data generation apparatus
21 Sound source separation unit
51 Discriminator training apparatus
52 Voice quality converter training apparatus
61 Discriminator training unit
71 Voice quality converter training unit
101 Voice quality conversion apparatus
111 Sound source separation unit
112 Voice quality conversion unit
113 Adding unit

The invention claimed is:

1. A signal processing apparatus, comprising:
a central processing unit (CPU) configured to:
receive first acoustic data of a sound of an input sound source;
receive a voice quality converter parameter, wherein
the voice quality converter parameter is trained based on a discriminator parameter, a speaker ID of a target sound source, and first training data of the sound of the input sound source,
the discriminator parameter is trained based on the first training data of the sound of the input sound source, second training data of a sound of the target sound source, and third training data of a sound of a sound source different from the input sound source and the target sound source,
the target sound source is different from the input sound source,
the discriminator parameter discriminates the input sound source of the first acoustic data,
the first training data and the second training data are based on second acoustic data of a mixed sound,
the mixed sound includes the sound of the input sound source and the sound of the target sound source, and
the second acoustic data is different from parallel data and clean data; and
convert the first acoustic data of the input sound source to third acoustic data of voice quality of the target sound source, wherein the conversion of the first acoustic data to the third acoustic data is based on the voice quality converter parameter.

2. The signal processing apparatus according to claim 1, wherein the first training data includes the first acoustic data of the sound of the input sound source.

3. The signal processing apparatus according to claim 1, wherein the first training data is acoustic data that is based on execution of sound source separation on the mixed sound.

4. A signal processing method, comprising:
receiving first acoustic data of a sound of an input sound source;
receiving a voice quality converter parameter, wherein
the voice quality converter parameter is trained based on a discriminator parameter, a speaker ID of a target sound source, and first training data of the sound of the input sound source,
the discriminator parameter is trained based on the first training data of the sound of the input sound source, second training data of a sound of the target sound source, and third training data of a sound of a sound source different from the input sound source and the target sound source,
the target sound source is different from the input sound source,
the discriminator parameter discriminates the input sound source of the first acoustic data,
the first training data and the second training data are based on second acoustic data of a mixed sound,
the mixed sound includes the sound of the input sound source and the sound of the target sound source, and
the second acoustic data is different from parallel data and clean data; and
converting the first acoustic data of the input sound source to third acoustic data of voice quality of the target sound source, wherein the conversion of the first acoustic data to the third acoustic data is based on the voice quality converter parameter.

5. A non-transitory computer-readable medium having stored thereon computer-executable instructions, which when executed by a computer, cause the computer to execute operations, the operations comprising:
receiving first acoustic data of a sound of an input sound source;
receiving a voice quality converter parameter, wherein
the voice quality converter parameter is trained based on a discriminator parameter, a speaker ID of a target sound source, and first training data of the sound of the input sound source,
the discriminator parameter is trained based on the first training data of the sound of the input sound source, second training data of a sound of the target sound source, and third training data of a sound of a sound source different from the input sound source and the target sound source, the target sound source is different from the input sound source, the discriminator parameter discriminates the input sound source of the first acoustic data, the first training data and the second training data are based on second acoustic data of a mixed sound, the mixed sound includes the sound of the input sound source and the sound of the target sound source, and the second acoustic data is different from parallel data and clean data; and converting the first acoustic data of the input sound source to third acoustic data of voice quality of the target sound source, wherein the conversion of the first acoustic data to the third acoustic data is based on the voice quality converter parameter.

6. A signal processing apparatus, comprising:

a central processing apparatus configured to:

receive specific acoustic data of a mixed sound, wherein the mixed sound includes a target sound of a target sound source and a non-target sound of a non-target sound source, and the target sound source is different from the non-target sound source;

execute sound source separation to separate the specific acoustic data into first acoustic data of the target sound source and second acoustic data of the non-target sound source;

receive a voice quality converter parameter, wherein the voice quality converter parameter is trained based on a discriminator parameter, a speaker ID of the target sound source, and first training data of a sound of an input sound source, the discriminator parameter is trained based on the first training data of the sound of the input sound source, second training data of the target sound of the target sound source, and third training data of a sound of a sound source different from the input sound source and the target sound source, the target sound source is different from the input sound source, the discriminator parameter discriminates the target sound source of the first acoustic data, the first training data is based on the specific acoustic data of the mixed sound, and the second acoustic data is different from parallel data and clean data;

execute voice quality conversion on the first acoustic data of the target sound to obtain third acoustic data, wherein the conversion of the first acoustic data is based on the voice quality converter parameter, and the first acoustic data is different from the parallel data and the clean data; and synthesize the third acoustic data and the second acoustic data of the non-target sound.

7. The signal processing apparatus according to claim 6, wherein the specific acoustic data includes the clean data corresponding to the target sound.

8. A signal processing method, comprising:

receiving specific acoustic data of a mixed sound, wherein the mixed sound includes a target sound of a target sound source and a non-target sound of a non-target sound source, and the target sound source is different from the non-target sound source;

executing sound source separation to separate the specific acoustic data into first acoustic data of the target sound source and second acoustic data of the non-target sound source;

receiving a voice quality converter parameter, wherein the voice quality converter parameter is trained based on a discriminator parameter, a speaker ID of the target sound source, and first training data of a sound of an input sound source, the discriminator parameter is trained based on the first training data of the sound of the input sound source, second training data of the target sound of the target sound source, and third training data of a sound of a sound source different from the input sound source and the target sound source, the target sound source is different from the input sound source, the discriminator parameter discriminates the target sound source of the first acoustic data, the first training data is based on the specific acoustic data of the mixed sound, and the second acoustic data is different from parallel data and clean data;

executing voice quality conversion on the first acoustic data of the target sound to obtain third acoustic data, wherein the conversion of the first acoustic data is based on the voice quality converter parameter, and the first acoustic data is different from the parallel data and the clean data; and synthesizing the third acoustic data and the second acoustic data of the non-target sound.

9. A non-transitory computer-readable medium having stored thereon computer-executable instructions, which when executed by a computer, cause the computer to execute operations, the operations comprising:

receiving specific acoustic data of a mixed sound, wherein the mixed sound includes a target sound of a target sound source and a non-target sound of a non-target sound source, and the target sound source is different from the non-target sound source;

executing sound source separation to separate the specific acoustic data into first acoustic data of the target sound source and second acoustic data of the non-target sound source;

receiving a voice quality converter parameter, wherein the voice quality converter parameter is trained based on a discriminator parameter, a speaker ID of the target sound source, and first training data of a sound of an input sound source, the discriminator parameter is trained based on the first training data of the sound of the input sound source, second training data of the target sound of the target sound source, and third training data of a sound of a sound source different from the input sound source and the target sound source, the target sound source is different from the input sound source, the discriminator parameter discriminates the target sound source of the first acoustic data, the first training data is based on the specific acoustic data of the mixed sound, and the second acoustic data is different from parallel data and clean data;

executing voice quality conversion on the first acoustic data of the target sound to obtain third acoustic data, wherein the conversion of the first acoustic data is based on the voice quality converter parameter, and the first acoustic data is different from the parallel data and the clean data; and synthesizing the third acoustic data and the second acoustic data of the non-target sound.

10. A training apparatus, comprising:

a central processing unit (CPU) configured to:

receive first training data of a sound of an input sound source, second training data of a sound of a target sound source, and third training data of a sound of a sound source different from the input sound source and the target sound source, wherein the first training data and the second training data are based on acoustic data of a mixed sound, the acoustic data is different from parallel data and clean data, the mixed sound includes the sound of the input sound source and the sound of the target sound source, and the target sound source is different from the input sound source;

train a discriminator parameter based on the first training data of the sound of the input sound source, the second training data of the sound of the target sound source, and the third training data of the sound of the sound source different from the input sound source and the target sound source, wherein the discriminator parameter is for discrimination of the input sound source;

generate a voice quality converter parameter based on the first training data of the sound of the input sound source, the discriminator parameter, and a speaker ID of the target sound source; and output the generated voice quality converter parameter.

11. A training method, comprising:

receiving first training data of a sound of an input sound source, second training data of a sound of a target sound source, and third training data of a sound of a sound source different from the input sound source and the target sound source, wherein the first training data and the second training data are based on acoustic data of a mixed sound, the acoustic data is different from parallel data and clean data, the mixed sound includes the sound of the input sound source and the sound of the target sound source, and the target sound source is different from the input sound source;

training a discriminator parameter based on the first training data of the sound of the input sound source, the second training data of the sound of the target sound source, and the third training data of the sound of the sound source different from the input sound source and the target sound source, wherein the discriminator parameter is for discrimination of the input sound source;

generating a voice quality converter parameter based on the first training data of the sound of the input sound source, the discriminator parameter, and a speaker ID of the target sound source; and outputting the generated voice quality converter parameter.

12. A non-transitory computer-readable medium having stored thereon computer-executable instructions, which when executed by a computer, cause the computer to execute operations, the operations comprising:

receiving first training data of a sound of an input sound source, second training data of a sound of a target sound source, and third training data of a sound of a sound source different from the input sound source and the target sound source, wherein the first training data and the second training data are based on acoustic data of a mixed sound, the acoustic data is different from parallel data and clean data, the mixed sound includes the sound of the input sound source and the sound of the target sound source, and the target sound source is different from the input sound source;

training a discriminator parameter based on the first training data of the sound of the input sound source, the second training data of the sound of the target sound source, and the third training data of the sound of the sound source different from the input sound source and the target sound source, wherein the discriminator parameter is for discrimination of the input sound source;

generating a voice quality converter parameter based on the first training data of the sound of the input sound source, the discriminator parameter, and a speaker ID of the target sound source; and outputting the generated voice quality converter parameter.

13. A training apparatus, comprising:

a central processing unit (CPU) configured to:

receive first training data of a sound of an input sound source, second training data of a sound of a target sound source, and a discriminator parameter, wherein the first training data and the second training data are based on a mixed sound including the sound of the input sound source and the sound of the target sound source, the discriminator parameter is trained based on the first training data of the sound of the input sound source, the second training data of the sound of the target sound source, and third training data of a sound of a sound source different from the input sound source and the target sound source, and the input sound source is different from the target sound source; and train a voice quality converter parameter for conversion of first acoustic data of the sound of the input sound source to second acoustic data of voice quality of the target sound source, wherein the first acoustic data is different from parallel data and clean data, the voice quality converter parameter is trained based on the received first training data of the input sound source, a speaker ID of the target sound source, and the discriminator parameter, and the discriminator parameter discriminates the input sound source of the first acoustic data.

14. A training method, by a training apparatus, comprising:

receiving first training data of a sound of an input sound source, second training data of a sound of a target sound source, and a discriminator parameter, wherein the first training data and the second training data are based on a mixed sound including the sound of the input sound source and the sound of the target sound source, the discriminator parameter is trained based on the first training data of the sound of the input sound source, the second training data of the sound of the target sound source, and third training data of a sound source different from the input sound source and the target sound source, and the input sound source is different from the target sound source; and training a voice quality converter parameter for conversion of first acoustic data of the sound of the input sound source to second acoustic data of voice quality of the target sound source, wherein the first acoustic data is different from parallel data and clean data, the voice quality converter parameter is trained based on the received first training data of the input sound source, a speaker ID of the target sound source, and the discriminator parameter, and the discriminator parameter discriminates the input sound source of the first acoustic data.

15. A non-transitory computer-readable medium having stored thereon computer-executable instructions, which when executed by a computer, cause the computer to execute operations, the operations comprising:

receiving first training data of a sound of an input sound source, second training data of a sound of a target sound source, and a discriminator parameter, wherein the first training data and the second training data are based on a mixed sound including the sound of the input sound source and the sound of the target sound source, the discriminator parameter is trained based on the first training data of the sound of the input sound source, the second training data of the sound of the target sound source, and third training data of a sound source different from the input sound source and the target sound source, and the input sound source is different from the target sound source; and training a voice quality converter parameter for conversion of first acoustic data of the sound of the input sound source to second acoustic data of voice quality of the target sound source, wherein the first acoustic data is different from parallel data and clean data, the voice quality converter parameter is trained based on the received first training data of the input sound source, a speaker ID of the target sound source, and the discriminator parameter, and the discriminator parameter discriminates the input sound source of the first acoustic data.

* * * * *